United States Patent [19]

Ikuta et al.

[11] Patent Number: 5,177,481
[45] Date of Patent: Jan. 5, 1993

[54] DATA GENERATOR FOR CONTROLLING PULSE WIDTH

[75] Inventors: Yoshihisa Ikuta, Toyonaka; Souichi Matsuyama, Kyoto; Takuji Okumura, Tondabayashi, all of Japan

[73] Assignee: Mita Industrial Co., Ltd., Japan

[21] Appl. No.: 736,285

[22] Filed: Jul. 25, 1991

[30] Foreign Application Priority Data

Aug. 1, 1990 [JP] Japan .................. 2-205572
Aug. 1, 1990 [JP] Japan .................. 2-205573
Aug. 1, 1990 [JP] Japan .................. 2-205574

[51] Int. Cl.⁵ .............................. H03M 5/08
[52] U.S. Cl. ............................. 341/53; 341/52
[58] Field of Search ............. 341/52, 53, 94, 118, 341/120; 375/22; 328/59, 111; 364/266.4

[56] References Cited

U.S. PATENT DOCUMENTS 4,660,033  4/1987  Brandt ........................ 340/825.72
4,872,028  10/1989  Lloyd ......................... 346/1.1
4,888,777  12/1989  Takeyama .
4,914,459  4/1990  Mama et al. .

Primary Examiner—A. D. Pellinen
Assistant Examiner—B. K. Young
Attorney, Agent, or Firm—Beveridge, DeGrandi & Weilacher

[57] ABSTRACT

A data generator generates input data for a pulse generator from source data corresponding to a desired pulse width in order to make the pulse generator generate an output pulse having the desired pulse width. In the data generator, the source data are converted into the input data for the pulse generator based on a predetermined conversion relation; the predetermined conversion relation is varied; the width of an output pulse of the pulse generator is compared with that of a calibration pulse having a predetermined pulse width; and a conversion relation between calibration source data corresponding to a pulse width of the calibration pulse and the input data is maintained when the width of the output coincides with that of the calibration pulse.

3 Claims, 23 Drawing Sheets

DATA GENERATOR FOR CONTROLLING PULSE WIDTH

BACKGROUND OF THE INVENTION

1. Field of the Invention

The present invention relates to a pulse generator (pulse width modulation pulse generating circuit) for generating a pulse whose pulse width is controlled, and more specifically, to a data generator for generating input data for the pulse generator from source data corresponding to a predetermined desired pulse width in order to make the pulse generator, where a width of an output pulse in response to the input data is varied (or is not clear), generate a pulse having the desired pulse width.

2. Description of the Prior Art

A laser output modulating system has been suggested to control printing density in some laser printing apparatuses employed for digital copying machines, laser printers, etc. In this case, since the laser output is normally controlled by a pulse width, pulse width modulation (PWM) for converting printing data into a pulse having a pulse width corresponding to the laser output is required.

In high-speed laser printing apparatuses, the speed for processing printing data is very high, and the width of the pulses for transmitting data is extremely small. Further, when information on a printing density (gradation information) is added to the data representing each printing dot to control the pulse width according to the printing density, it is required to employ an extremely high-speed clock pulse as the reference clock pulse. For example, in order to express a printing density (gradation) with eight steps, a reference pulse, having a pulse width a eighth the pulse width when there is no gradation, has to be provided. However, when the high-speed reference clock pulse is used, peripheral devices of high-speed type are required, which largely increases the cost of the apparatuses as a whole. Therefore, it is undesirable to adopt such a high-speed reference clock pulse for popular office automation apparatuses.

Thereupon, a method has been considered where in order to perform the above-described pulse width modulation (PWM), a PWM pulse is generated not by using the high-speed reference clock pulse but by using delay devices. In the method, a reference pulse (normally, a clock pulse) is delayed by some delay devices, and a pulse having a small width (the delay time corresponds to the width) is obtained based on the difference between the delayed pulse and the reference pulse (not delayed).

In order to obtain a pulse having a given width from a PWM pulse generating circuit (hereinafter referred to as PWM circuit) employing delay devices, data on the number of steps of the delay devices, that is, how many delay devices of the PWM circuit should be activated are inputted to the PWM circuit.

However, since the characteristics of the delay devices are slightly different every PWM circuit (generally an integrated circuit (IC)), the width of the output pulses are different every PWM circuit (IC) even if the same step-number data are inputted. Moreover, even in a single PWM circuit, the width of the output pulses in response to the same input data (step-number data) varies according to a variation in temperature in the environment where the circuit is used and a variation in supply voltage.

Conventionally, the difference among each of the PWM circuits (IC) is adjusted by deciding a relation between the input and output every IC, which requires a lot of time and hands. Further, although the above-described method can remove the difference among each of the PWM circuits, the method could not cope with the variation in width of the output pulses according to a variation in environmental temperature and supply voltage.

On the other hand, when the PWM circuit is employed for a specific apparatus such as a laser printer, etc., the data (source data) for specifying the width of the pulses outputted by the PWM circuit cannot be varied according to the environmental temperature and supply voltage. For example, in a laser printer where printing density is controlled by laser output duration, data on printing density (hereinafter referred to as printing data) is inputted to the PWM circuit, and pulses having a predetermined width to be given to the laser generator are outputted. However, the printing data cannot be varied according to the difference among the PWM circuits or the variation in characteristic of the PWM circuits. Thereupon, a generator is required for generating input data for a pulse generating circuit based on source data (printing data in the above example) for making the PWM circuit generate pulses having a desired width.

FIG. 3 shows the the relation among the above-described printing data (source data), step-number data inputted to the PWM circuit, and width (a relative value when the reference pulse is 100%) of the pulses outputted by the PWM circuit. The three straight lines shown in the left half of the graph of FIG. 3 represent the relation between the inputted step-number data and the width of the outputted pulses with respect to three types of PWM circuits, that is, a PWM circuit CMIN consisting of delay devices having an extremely short delay time, a PWM circuit CMAX consisting of delay devices having an extremely long delay time and a PWM circuit CMD consisting of delay devices having an approximately middle delay time between the above-described two. For example, in order to obtain a pulse having a width of 50% from the PWM circuit CMIN consisting of delay devices having an extremely short delay time, data on a higher number of steps than that of the PWM circuit CMD having a middle delay time have to be inputted (that is, more delay devices have to be used). Further, since the delay times of the delay devices vary according to a change in environmental temperature and supply voltage even in a single PWM circuit as described above, the relation between the input data (step-number data) and the width of the output pulses changes from CMIN to CMAX according to circumstances.

As described above, even if the step-number data, that is, the printing data converted by a fixed relation L, are inputted into the PWM circuit where the width of the output pulses in response to input data varies, the width of pulses obtained thereby differs every PWM circuit or varies according to the environmental temperature and supply voltage. For example, even if printing data P50 corresponding to a density of 50% are inputted, the width of pulses (that is, the actual printing density) obtained thereby may be t1 which is lower than 50% (in CMIN), or may be 100% (that is, black) (in CMAX). Moreover, even if printing data P100 corresponding to a density of 100% (black) are inputted, there can be some cases where the width of pulses is t2 (that is, halftone) (in CMIN).

Another problem of the PWM pulse generating circuit employing delay devices is that a pulse having a width equal to or smaller than a predetermined minimum width or a width equal to or larger than a maximum width cannot be obtained from the pulse generating circuit. Since the principle of the pulse generation by the PWM circuit employing delay devices is as described above, naturally, the output pulse of the PWM circuit should be able to arbitrarily (if the number of steps of the delay devices is sufficient) take a value between 0 and 100% of a period T of the reference pulse (see (a) of FIG. 12). Actually, however, the output pulse is limited by the delay characteristic of an output buffer of the PWM circuit, so that, as shown in (b) of FIG. 12, a pulse having a width equal to or smaller than the predetermined minimum width tMIN is not outputted, nor is a pulse having a width equal to or larger than the maximum width tMAX. That is, even if the step-number data corresponding to a width equal to or smaller than tMIN are inputted into the PWM circuit, the output remains 0 (see (c) of FIG. 12); even if the step-number data corresponding to a width equal to or larger than tMAX are inputted, the output remains 1 (see (d) FIG. 12). FIG. 11 shows the relation between the step-number data inputted to the PWM circuit and the width of the output pulse (when the period T of the reference pulse is 100%). Therefore, in adjusting the PWM output, the above problem must be considered.

SUMMARY OF THE INVENTION

An object of the present invention is to provide, in order to solve the above-described problems, a data generator, for controlling pulse width, for generating correct pulses having a predetermined pulse width and further for obtaining a pulse output correctly corresponding to source data by sufficiently considering a characteristic of the PWM circuit.

According to one feature of the present invention, a data generator, for controlling pulse width, which generates input data for a pulse generator from source data corresponding to a desired pulse width in order to make said pulse generator generate an output pulse having the desired pulse width, comprises:

converting means for converting the source data into the input data for the pulse generator based on a predetermined conversion relation;

conversion relation varying means for varying said predetermined conversion relation;

phase comparing means for comparing a pulse width of an output pulse of the pulse generator with a pulse width of a calibration pulse having a predetermined pulse width; and conversion relation maintaining means for maintaining a conversion relation between calibration source data corresponding to a pulse width of the calibration pulse and the input data when the pulse width of the output pulse coincides with the pulse width of the calibration pulse at the phase comparing means.

According to another feature of the present invention, a data generator for controlling pulse width comprises:

converting means for converting the source data into the input data for the pulse generator based on a predetermined conversion relation;

conversion relation varying means for varying said predetermined conversion relation;

pulse detecting means for detecting whether or not pulses generate in an output of the pulse generator; and conversion relation maintaining means for maintaining a conversion relation between the source data and the input data when pulses start to generate in the output of the pulse generator.

According to still another feature of the present invention, a data generator for controlling pulse width comprises:

converting means for converting the source data into the input data for the pulse generator based on a predetermined conversion relation;

conversion relation varying means for varying said predetermined conversion relation;

pulse detecting means for detecting whether or not there are pulses in an output of the pulse generator;

first conversion relation maintaining means for maintaining a conversion relation between the source data and the input data when pulses start to generate in the output of the pulse generator;

phase comparing means for comparing a pulse width of an output pulse of the pulse generator with a pulse width of a calibration pulse having a predetermined pulse width; and second conversion relation maintaining means for maintaining a conversion relation between calibration source data corresponding to a pulse width of the calibration pulse and the input data when the pulse width of the output pulse coincides with the pulse width of the calibration pulse at the phase comparing means.

According to the present invention, a pulse having a desired width is always obtained even if a pulse generator where the relation between the input data and the width of the output pulse varies (or is not clear) is employed. Therefore, the data generator according to the present invention can be employed when pulse generators having different characteristics, respectively, are incorporated in an application device, or when a pulse width is not stable due to factors such as the peripheral temperature, supply voltage, etc. in a PWM pulse generator incorporated in a device. Thereby, a PWM control where a stable pulse width output is always obtained in response to source data (printing data, etc.) can be performed without changing the source data. Further, when a pulse generator has a characteristic that it cannot generate pulses having a width equal to or smaller than a predetermined minimum width or a width equal to or larger than a maximum width, by making up for such a characteristic, the most desirable relation between the source data and the width of the output pulses can be set.

BRIEF DESCRIPTION OF THE DRAWINGS

These and other objects and features of this invention will become clear from the following description taken in conjunction with the preferred embodiments with reference to the accompanied drawings in which.

DETAILED DESCRIPTION OF THE PREFERRED EMBODIMENTS

Figure 1:
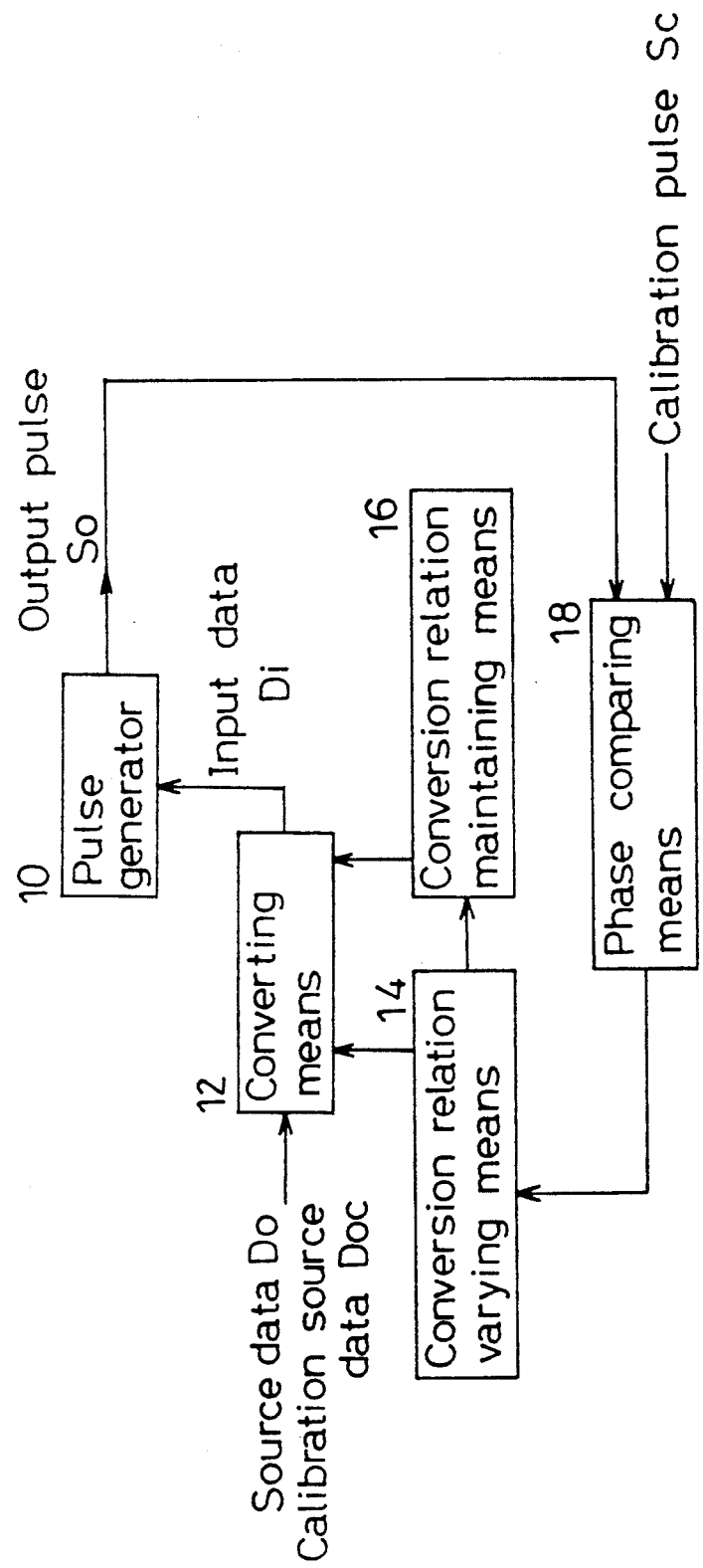
FIG. 1 is a block circuit diagram showing a first feature of the present invention.

FIG. 1 is a block diagram of a principal portion of a first feature of the present invention. In the FIG., 10 represents a pulse generator, 12 represents converting means for converting source data Do into input data Di for the pulse generator 10 based on a predetermined conversion relation, 14 represents conversion relation varying means for varying the predetermined conversion relation, 18 represents phase comparing means for comparing an output pulse So of the pulse generator 10 with a calibration pulse Sc having a predetermined pulse width, and 16 represents conversion relation maintaining means for maintaining a conversion relation between the input data Di and calibration source data Doc corresponding to a width of the calibration pulse Sc when the widths of the pulses So and Sc coincide at the phase comparing means 18.

With the above-described feature, the input data Di for the pulse generator 10 are generated from the source data Do corresponding to a desired pulse width in order that the pulse generator 10 generates the output pulse So having the desired pulse width.

That is, firstly, the source data Do are converted into the input data Di for the pulse generator 10 at the converting means 12 based on a predetermined conversion relation. The conversion relation varying means 14 vary the conversion relation. Therefore, the input data Di are changed even if uniform source data (calibration source data) Doc representing a width of the calibration pulse Sc has been given to the converting means 12. The pulse generator 10 generates the pulse So having a pulse width corresponding to the input data Di at each point of time. The phase of the pulse So is compared with that of the calibration pulse Sc at the phase comparing means 18. The result is returned to the conversion relation varying means 14. Thereby, the conversion relation varying means 14 vary the conversion relation at the converting means 12 so that the widths of the pulse So and Sc coincide, whereby the input data Di are influenced. When the width of the output pulses So of the pulse generator 10 coincides with that of the calibration pulse Sc, the conversion relation at that time between the calibration source data Doc and the input data Di is maintained in the conversion relation means 16.

After the calibration with respect to the data conversion is completed as described above, when the source data Do corresponding to a desired pulse width is inputted into the converting means 12, the converting means 12 generate the input data Di based on the above-described relation maintained in the conversion relation maintaining means 16, and input the data Di into the pulse generator 10. Thereby, the pulse generator 10 generates the pulse So having the desired pulse width.

Figure 2:
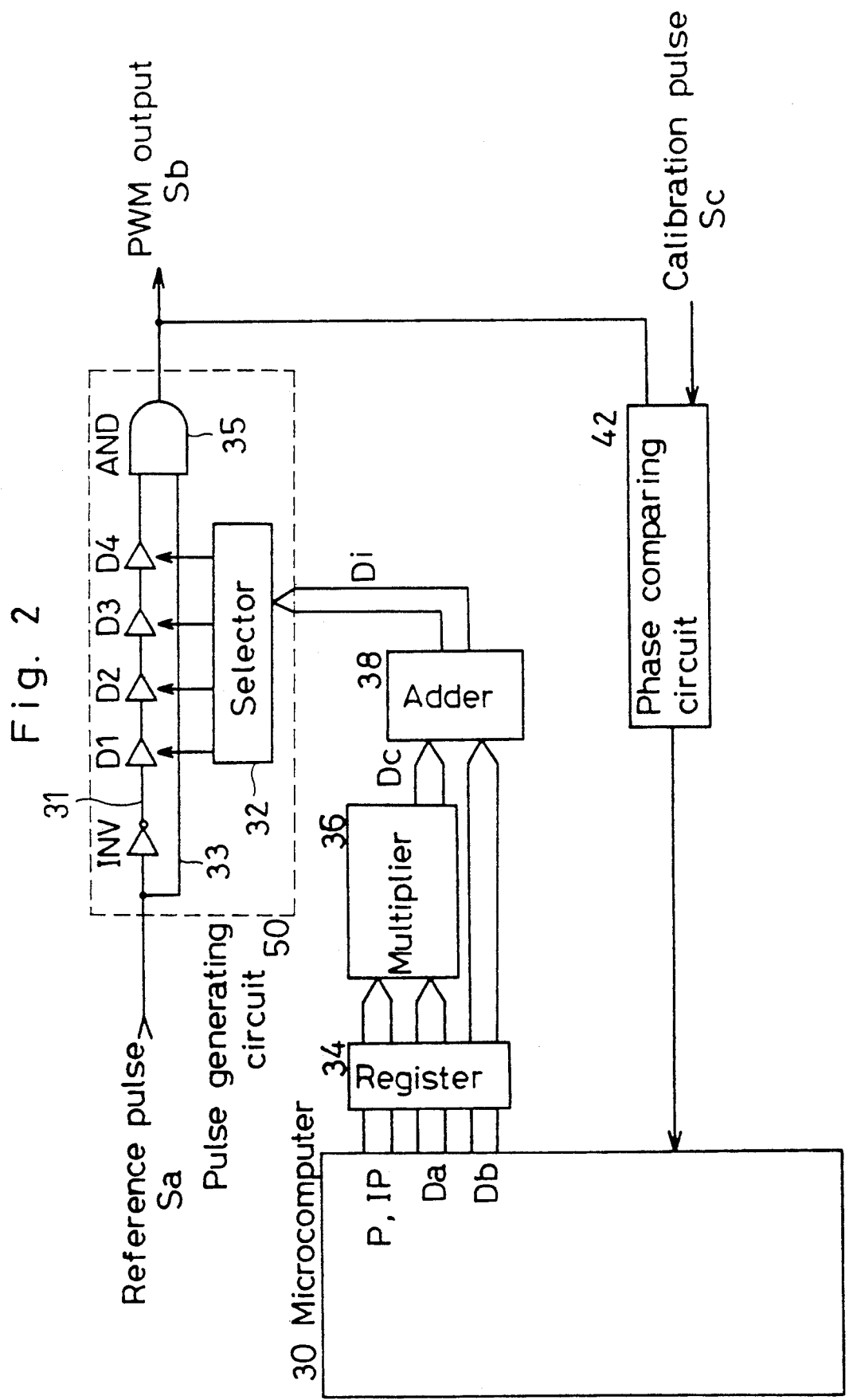
FIG. 2 is a block diagram showing a structure of a PWM pulse generating circuit which is a specific embodiment of the first feature shown in FIG. 1.

FIG. 2 shows a specific embodiment of the first feature shown in FIG. 1. That is, FIG. 2 is a block diagram of a PWM pulse generating circuit for adjusting a laser output of laser printing apparatuses for digital copying machines. In this embodiment, a pulse generating circuit 50 consists of an inverter INV, four delay devices D1, D2, D3 and D4, a selector 32 for selecting the delay devices to be used by the pulse generating circuit 50 and an AND circuit 35. The pulse generating circuit 50 generates a pulse Sb having a given pulse width (within the period of a reference pulse Sa) based on the reference pulse Sa. The principal thereof is as hereinafter described.

The reference pulse Sa is divided into two routes in the pulse generating circuit 50. Inverted and delayed on one route 31 and being intact on the other route 33, the pulse Sa is inputted into the AND circuit 35. Therefore, the AND circuit 35 outputs the pulse Sb having a pulse width corresponding to the delay time by the combination of delay devices D1, D2, D3, D4 and D5.

By inputting the data Di on the number of steps (hereinafter referred to step-number data) into the selector 32 here, the delay devices (a combination of one, or two or more of the delay devices D1, D2, D3 and D4) representing the number of steps corresponding to the data are selected to adjust the delay time, whereby the pulse generating circuit 50 outputs pulses having a pulse width corresponding to the input data Di. The pulse generating circuit 50 is for generating, from the data for adjusting a printing density (hereinafter referred to as printing data) used for a laser printing apparatuses. pulses having a pulse width proportional to the printing density. For this reason, a multiplier 36 for multiplying correction coefficient data Da for converting the printing data into the step-number data and an adder 38 for adding offset data Db are provided.

Figure 3:
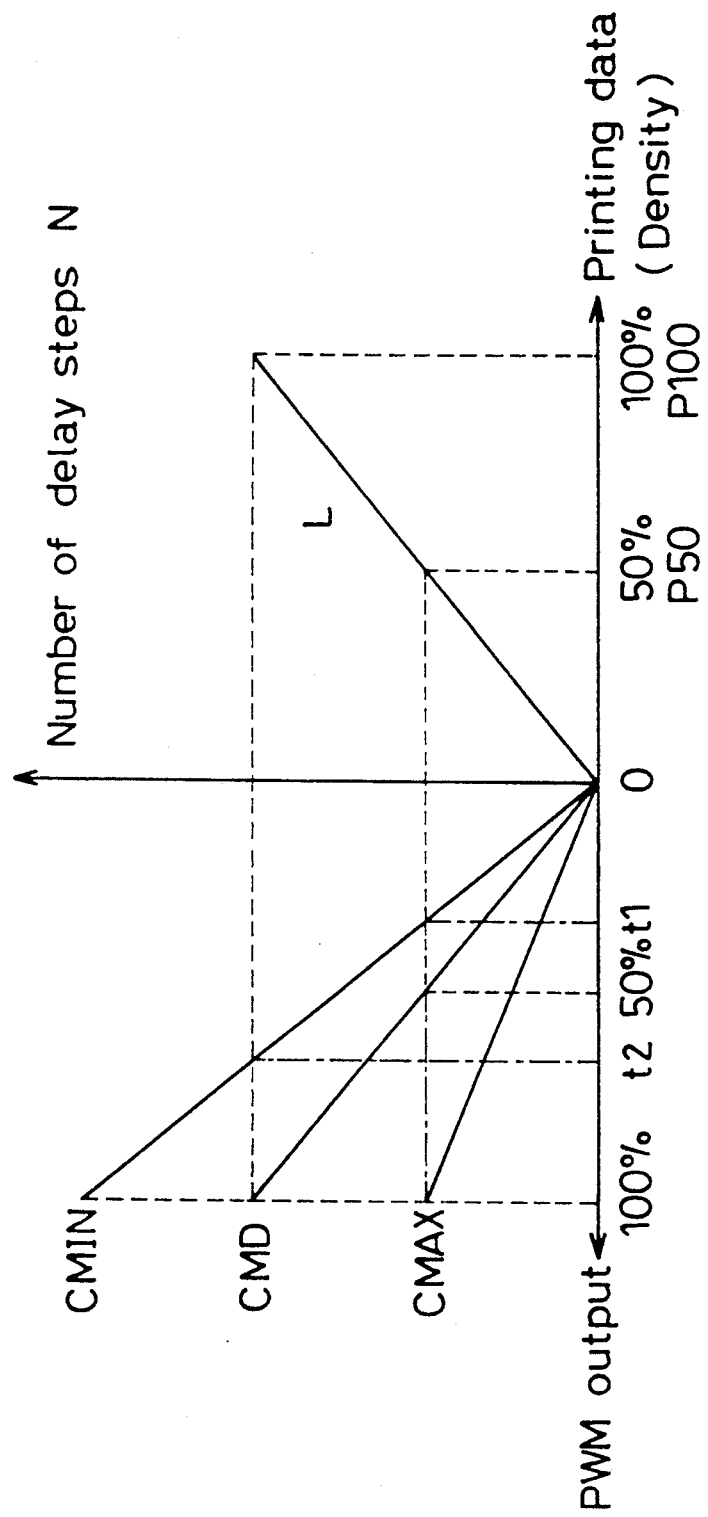
FIG. 3 is a graph showing a relation between printing data and step-number data (right side) and a relation between input step-number data and the width of the output pulse (left side) of a pulse generator employing delay devices.

However, the relation between the input step-number data Di and the width of the output pulse is varied, since each of the delay device units (a unit where the delay devices D1, D2, D3 and D4 are formed on a substrate) constituting the pulse generating circuit 50 has a different characteristic, and since even in a single delay device unit, the delay time is varied by the influence of environmental temperature and supply voltage (see FIG. 3).

In this embodiment, by employing a microcomputer 30, the correction coefficient data Da in converting the printing data into the step-number data Di and the offset data Db are corrected one after another, as hereinafter described, in order to adjust the relation between the printing data and the PWM output Sb (that is, the printing density) so as to always approach a correct and ideal condition.

Firstly, this embodiment is provided with a phase comparing circuit 42 for comparing the phase of the PWM output Sb with that of the calibration pulse Sc. The calibration pulse Sc to be inputted into the phase comparing circuit 42 is a pulse having a pulse width corresponding to the value of a point within the PWM output Sb. Usually, it is preferable that the calibration pulse Sc has a pulse width most frequently used (or to be most precisely controlled) in the PWM circuit.

Figure 4:
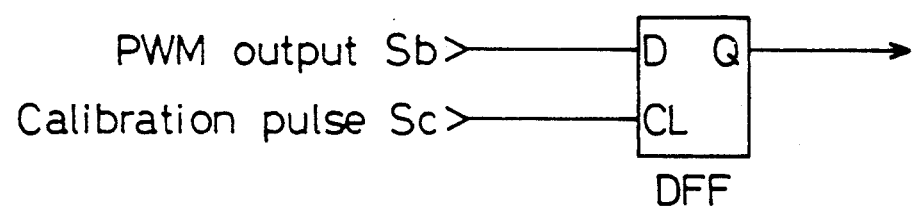
FIG. 4 is a circuit diagram showing a specific example of a structure of a phase comparing circuit shown in FIG. 2.

FIG. 4 shows a specific example of a structure of a phase comparing circuit. As shown in the figure, the phase comparing circuit can be consitiuted by a D flip flop DFF.

Next, an operation of the microcomputer 30 will be described when the relation between the printing data and the width of the output pulse is calibrated at a middle density point in the PWM pulse generating circuit of the above-described structure. In the following example, the middle density point is 50%.

Figure 5:
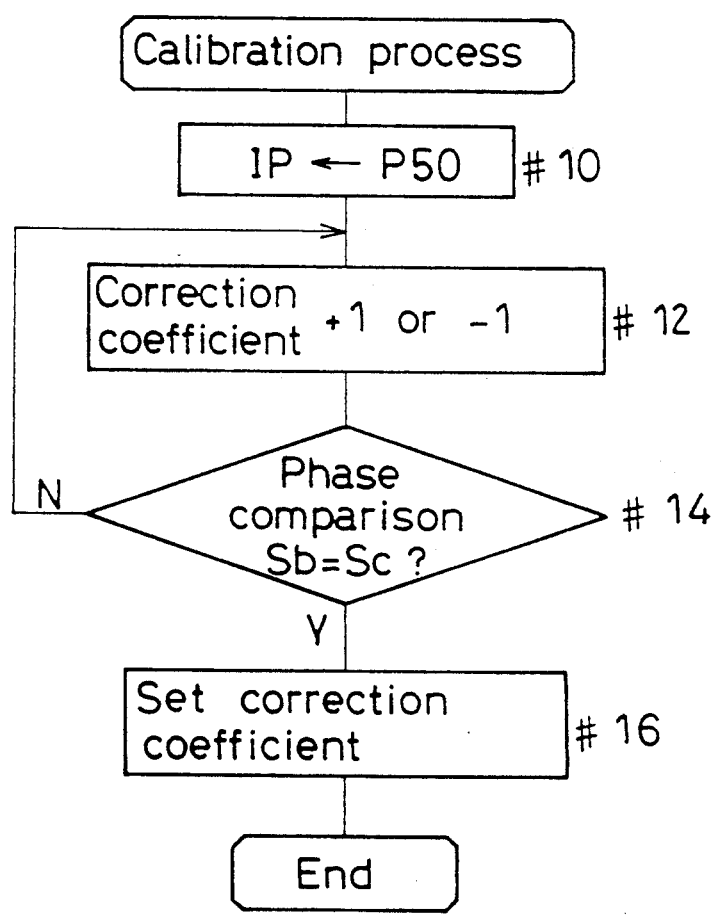
FIG. 5 is a flow chart of a process executed by a microcomputer of the embodiment shown in FIG. 2.

In this case, the microcomputer 30 executes a calibration process shown in FIG. 5 by using an output of the phase comparing circuit 42. In the process, the correction coefficient data Da for obtaining a desirable PWM output Sb in response to the printing data are generated. Firstly, at step #10, a value P50 corresponding to a printing density of 50% is given as test data IP to a first portion of a register 34. The first portion of the register 34 is a place where printing data P is placed under a normal condition. At the next step #12, the value of the correction coefficient data Da is increased or decreased by 1 from the present value. The value of the offset data Db is set to 0. Thereby, the test data IP (P50) and the correction coefficient data Da are multiplied at the multiplier 36, and at the adder 38, the input data (step-number data) Di is obtained by adding the multiplication result Dc and the offset data Db (=0). The data Di is given to the selector 32. At step #14, the PWM output pulse Sb corresponding to the input data Di generated as described above is compared with the calibration pulse Sc having a pulse width corresponding exactly to a printing density of 50% at the phase comparing circuit 42. When the widths of both of the pulses Sb and Sc are different, the process returns to step #12, where when the width of the PWM output pulse Sb is smaller than that of the calibration pulse Sc, the value of the correction coefficient data Da is increased by 1 and when Sb>Sc, it is decreased by 1. By changing the value of the correction coefficient data Da as described above, the width of the output pulse Sb approaches that of the calibration pulse Sc (that is, the pulse width corresponding to a printing density of 50%). When Sb coincides with Sc, the process proceeds to step #16, where the correction coefficient data Da at that time are set in the register 34. Then, the calibration process is finished.

Figure 6:
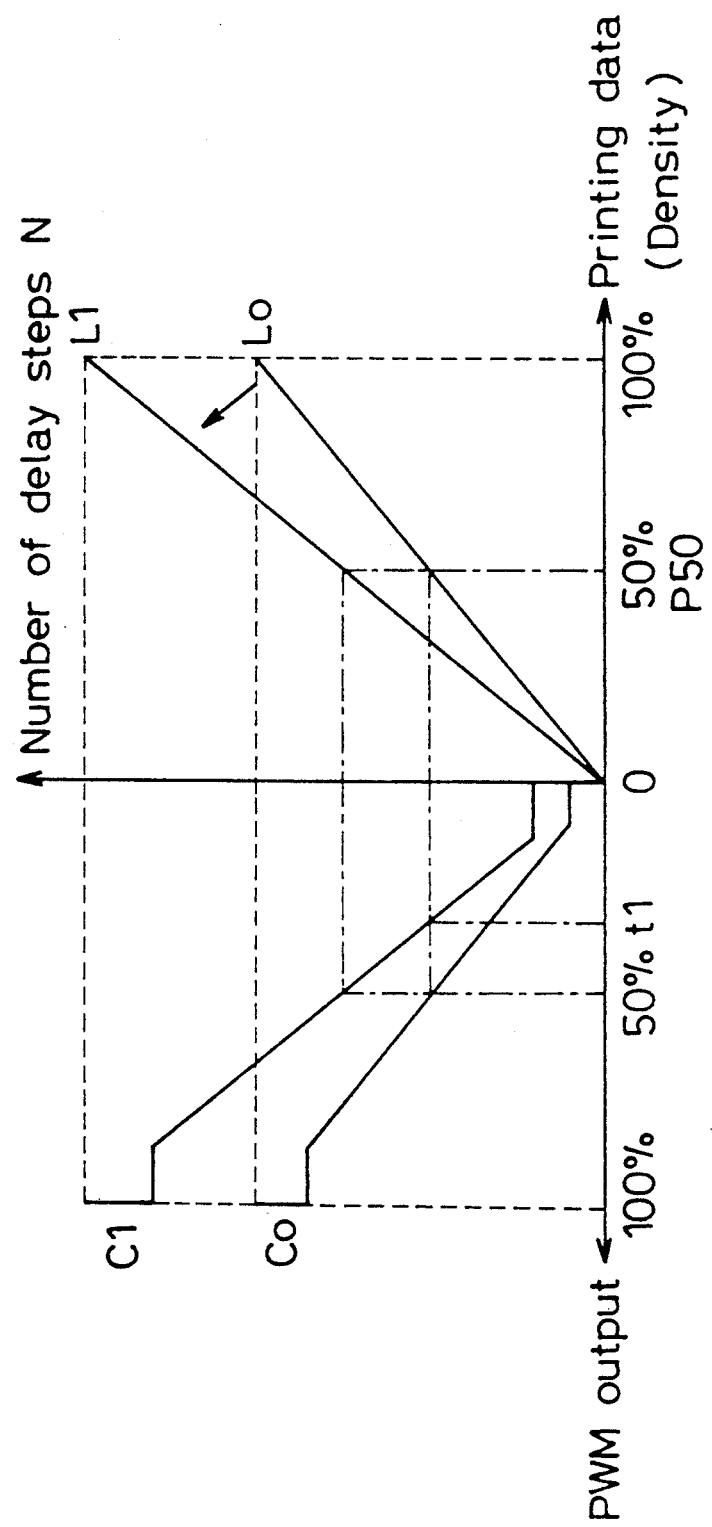
FIG. 6 is an explanatory view for explaining calibration processes executed in the embodiment shown in FIG. 2 and the embodiment shown in FIG. 7.

Referring to FIG. 6, the above-described calibration process is explained as follows. It is assumed that: at first, a relation between the input (step-number) data and the pulse width of the PWM circuit is represented by a line Co on the left side of the graph in the figure; corresponding to that, a conversion from the printing data into the step-number data is represented by a line Lo; the printing data are correctly converted into a pulse width. That is, it is assumed that when the printing data P50 corresponding to a printing density of 50% are inputted, pulses having a width corresponding exactly to 50% are outputted by the PWM circuit as understood by the lines Co and Lo. However, assuming that the characteristic of the delay devices of the PWM circuit is changed (that is, the delay time is decreased) by a change in environmental temperature or by a variation in supply voltage so that the relation between the input step-number data and the width of the output pulse is changed to a relation represented by a line C1, a density in accordance with the printing data cannot be obtained (that is, the printing density decreases) even if the printing data P50 representing a printing density of 50% is converted into the step-number data with the line Lo, since the width of the outputted pulses is t1 which is smaller than a pulse width corresponding to a printing density of 50%. Therefore, in the above-described calibration process, the printing data P50 corresponding to the middle density (50% in the above-described example) are inputted as the test data, and by gradually changing the value of the correction coefficient data Da (increased or decreased by 1) while the phase of the output pulses is compared with that of a reference pulse, a line L1 where the width of the output pulse Sb corresponds correctly to the middle density (50%) is obtained.

Although the correction coefficient data Da are calibrated only at the middle density point in the above-described example, the correct printing density is obtained nearly in the entire area of the printing data as shown by the line L1. Therefore, by setting the calibrated correction coefficient data Da in the register 34 and thereafter giving the actual printing data P to a place of the register 34 where the test data IP are placed, the printing data P are converted into pulses having a pulse width corresponding to a printing density represented thereby and are outputted into a laser printing apparatus.

Figure 7:
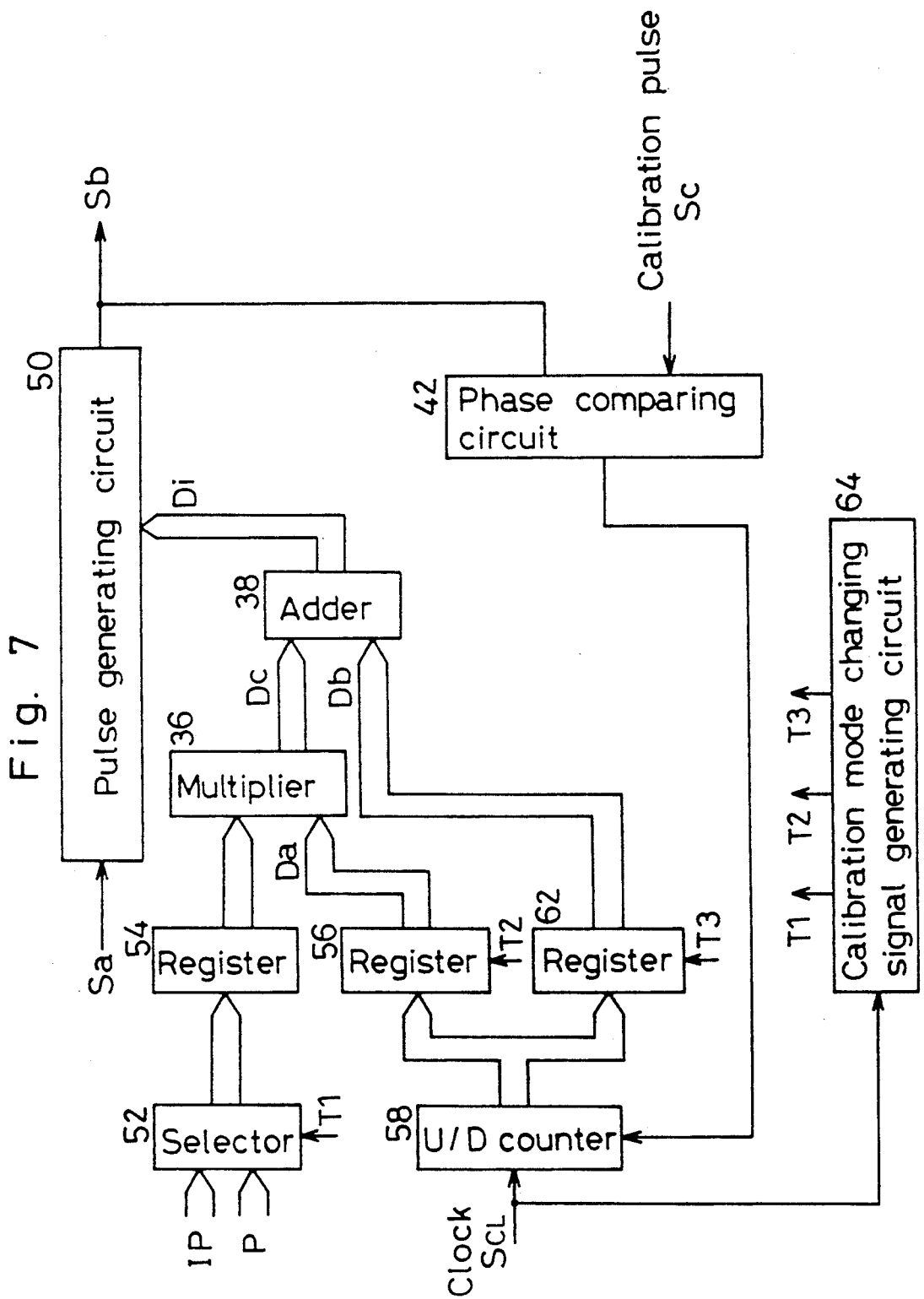
FIG. 7 is a block diagram showing a structure of a PWM pulse generating circuit which is another specific embodiment of the first feature shown in FIG. 1.

The above-described embodiment shown in FIG. 2 is controlled by the microcomputer 30 in a manner of software. Next, a PWM control of similar type by a counter, etc. in a manner of hardware will be described referring to FIG. 7. A basic structure of this embodiment is the same as that of the circuit shown in FIG. 2. In the figure, a pulse generating circuit 50, a phase comparing circuit 42, a multiplier 36 and an adder 38 are the same as those shown in FIG. 2. In this second embodiment, an up and down counter (hereinafter referred to as U/D counter) 58 is employed in place of the microcomputer 30, and optimal correction coefficient data Da and offset data Db are determined while the value of the correction coefficient data Da and that of the offset data Db are increased or decreased by 1 based on a result of a phase comparison. A method will hereinafter be described where with the PWM circuit of the above-described structure, the correction coefficient data Da is calibrated at a middle density point by using the phase comparing circuit 42 similarly to the above-described embodiment of FIG. 2.

In the PWM circuit, a calibration can be made in various modes by giving, from a mode changing signal generating circuit 64, a changing signal T1 to a data selector 52, a changing signal T2 to a register 56 for the correction coefficient data Da, a changing signal T3 to a register 62 for the offset data Db. In a mode where by using the phase comparing circuit 42, a calibration is made by comparing the output pulse Sb with the calibration pulse Sc at the middle density point (50%) similarly to the above-described embodiment of FIG. 2, the mode changing signal generating circuit 64 outputs the following three changing signals T1 to T3:

1) the changing signal T1 for changing the data selector 52 to the test data IP side;

2) the changing signal T2 for making the correction coefficient register 56 output data to the multiplier 36; and 3) the changing signal T3 for preventing the offset data register 62 from outputting data to the adder 38.

When the phase comparison calibration mode is set by giving the above-described changing signals, firstly, the test data IP are given as the data (P50) corresponding to a density of 50% to the multiplier 36 through the register 54. Then, the phase of the output pulse Sb generated thereby at the pulse generating circuit 50 is compared with that of the calibration pulse Sc having a pulse width corresponding exactly to a density of 50% at the phase comparing circuit 42. The output value of the U/D counter 58 is increased (when Sb<Sc) or decreased (when Sb>Sc) according to the result of the phase comparison. The value of the counter increased or decreased as described above is transmitted from the register 56 only to the multiplier 36 (it is not transmitted to the adder 38), and as shown in FIG. 6, works so that the inclination of the present data conversion line Lo approaches that of the correct conversion line L1. When the phase of the pulses Sb and Sc coincide, the counter value is set in the register 56 as the correction coefficient data Da.

After the correction coefficient data Da are calibrated as described above, by changing the data selector 52 and inputting normal printing data P into the register 54, the printing data P is multiplied by the calibrated correction coefficient data Da at the multiplier 36, so that correct step-number data Di are generated. Thus, the width of the output pulse Sb takes a value proportional to the printing data P nearly in the entire range of printing density (see FIG. 6), so that a printing density in accordance with the printing data is obtained.

Figure 8:
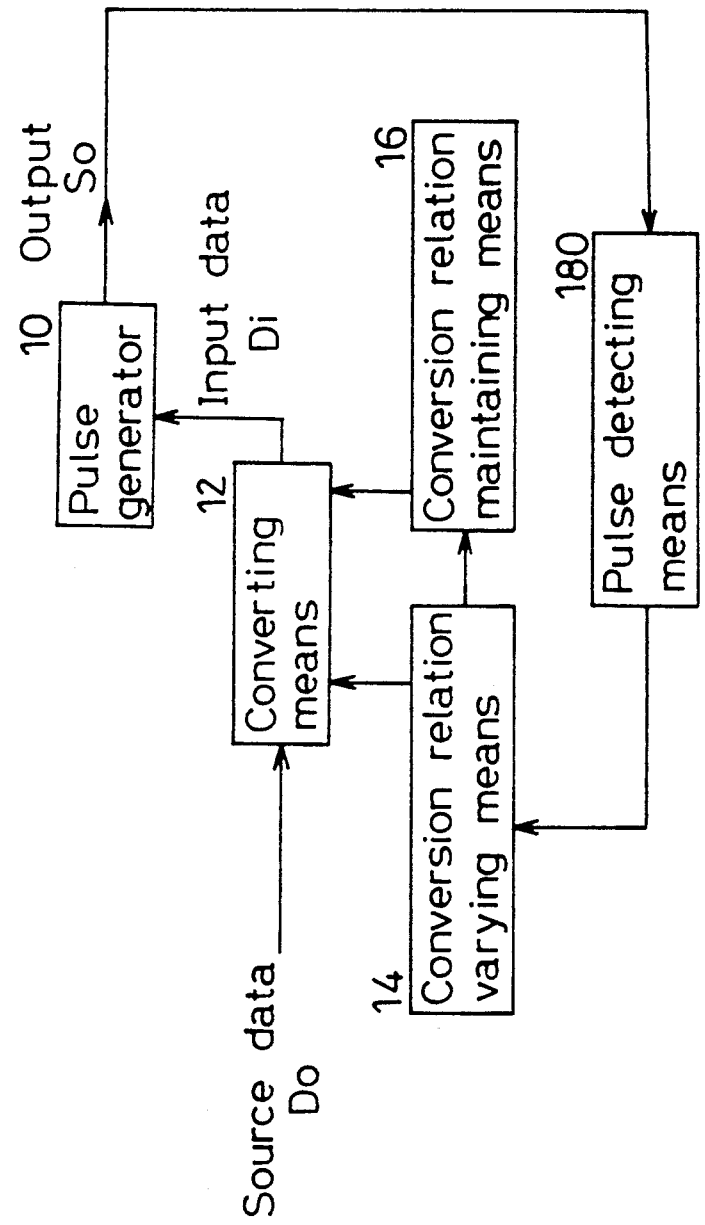
FIG. 8 is a block circuit diagram of a second feature of the present invention.
Figure 12:
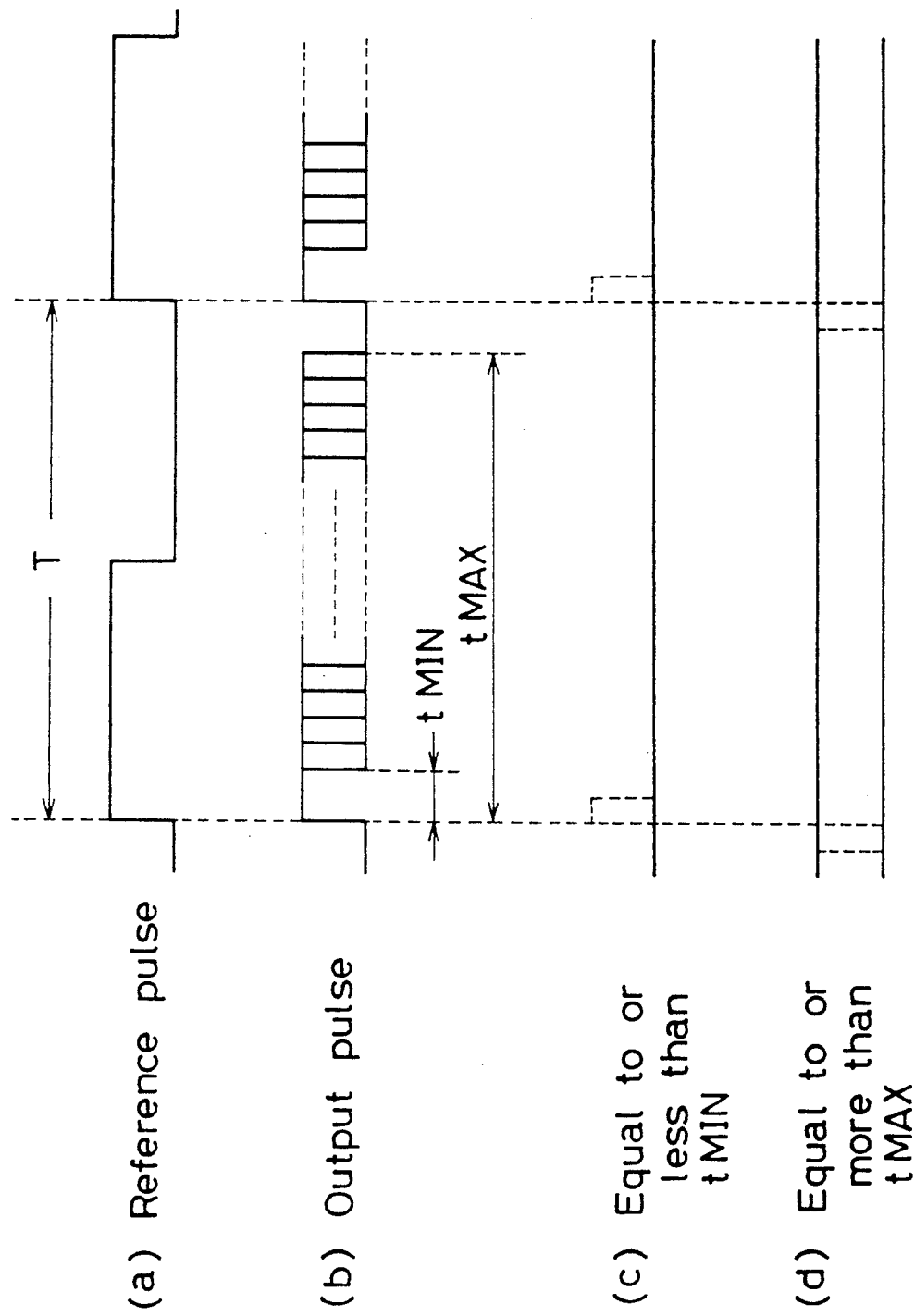
FIG. 12 is an explanatory view showing conditions of pulses generated by the pulse generator employing delay devices.

FIG. 8 is a block diagram showing a second feature of the present invention. FIG. 8 is different from FIG. 1 in that a pulse detecting means 180 is provided in place of the phase comparing means 18. The pulse detecting means 180 detects whether or not pulses are generated in an output of a pulse generator. Further, the pulse detecting means 180 and the conversion relation varying means 14 detect the conversion relation when the pulse generator 10 starts to output pulses. That is, when pulses have not been outputted yet, the input data Di are changed so that the pulse generator 10 outputs pulses by varying the conversion relation at converting means 12; when pulses are being outputted, the input data Di are changed so that the pulse generator 10 stops outputting pulses. Here, the condition where the pulse generator 10 does not output pulses means not only the condition shown in (c) of FIG. 12 but also the condition shown in (d) of FIG. 12. The conversion relation between the source data Do and the input data Di when the pulse generator 10 starts to output pulses is maintained by conversion relation maintaining means 16.

After the calibration by a detection when the pulse generator 10 starts to output pulses is finished, when source data Do corresponding to a desired pulse width are inputted into the converting means 12, the converting means 12 generate the input data Di based on the above-mentioned relation maintained by the conversion relation maintaining means 16, and input the data Di into the pulse generator 10. Thereby, the pulse generator 10 always generates the pulses So in response to any source data Do.

Figure 9:
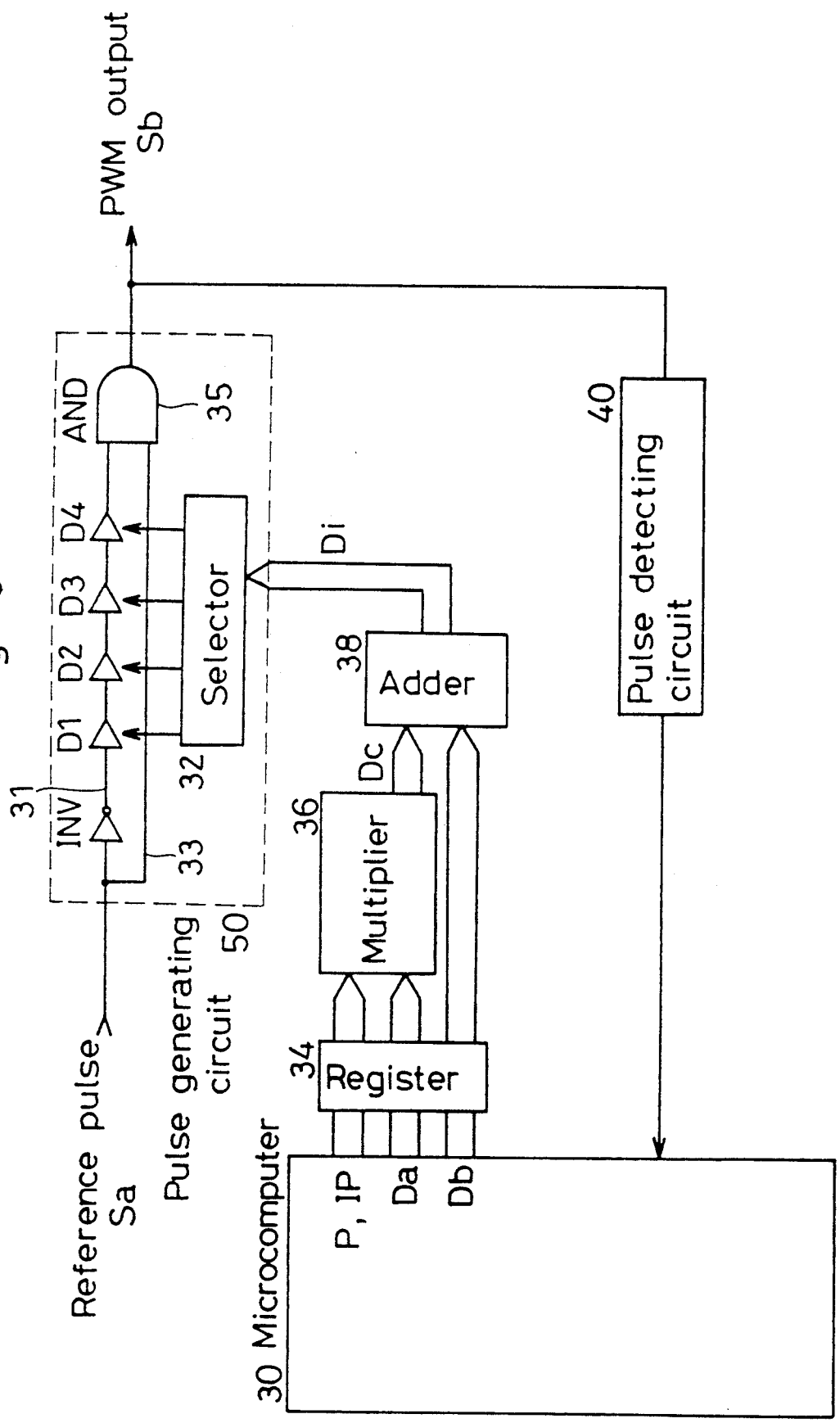
FIG. 9 is a block diagram showing a structure of a PWM pulse generating circuit which is an embodiment of the second feature shown in FIG. 8.

FIG. 9 shows a case where the feature shown in FIG. 8 is applied to a PWM pulse generating circuit for adjusting a laser output of a laser printing apparatus for digital copying machines. FIG. 9 is different from FIG. 2 in that a pulse detecting circuit 40 is provided in place of the phase comparing circuit 42. The pulse detecting circuit 40 detects the point of time when pulses are detected as shown in (b) of FIG. 12 from the conditions shown in (c) and (d) of FIG. 12.

Figure 10:
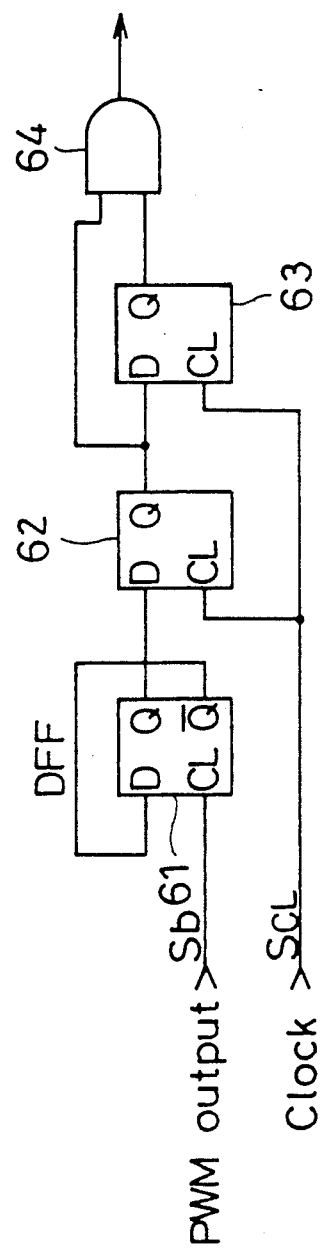
FIG. 10 is a circuit diagram showing a specific example of a structure of a pulse detecting circuit shown in FIG. 9.
Figure 11:
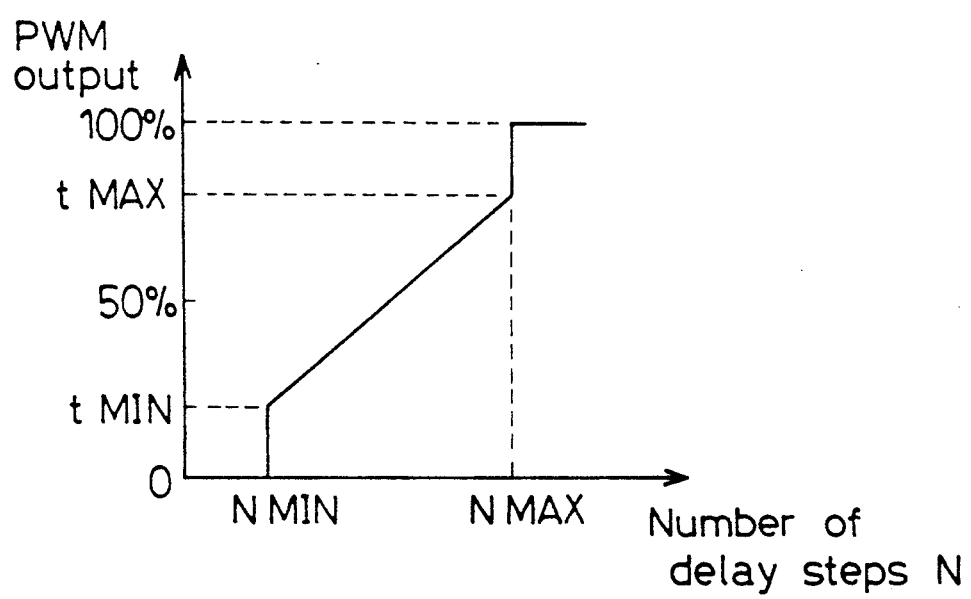
FIG. 11 is a graph showing a difference between input step-number data and a width of an output pulse of a pulse generator employing delay devices especially when the input step-number data are extremely small or extremely large.

FIG. 10 shows a specific structure of the pulse detecting circuit 40. In the figure, the pulse detecting circuit 40 consists of three D flip flops (DFF) 61, 62 and 63 and an AND circuit 64.

Next, an operation of a microcomputer 30 will be described in the case where at the PWM pulse generating circuit of the above-described structure, a relation between the printing data and the width of the output pulse is calibrated so that the PWM pulse generating circuit starts to generate pulses exactly when the printing data represents 0 (white) and 100% (black) (so that pulses disappear exactly when the printing data represents 100%).

Figure 13:
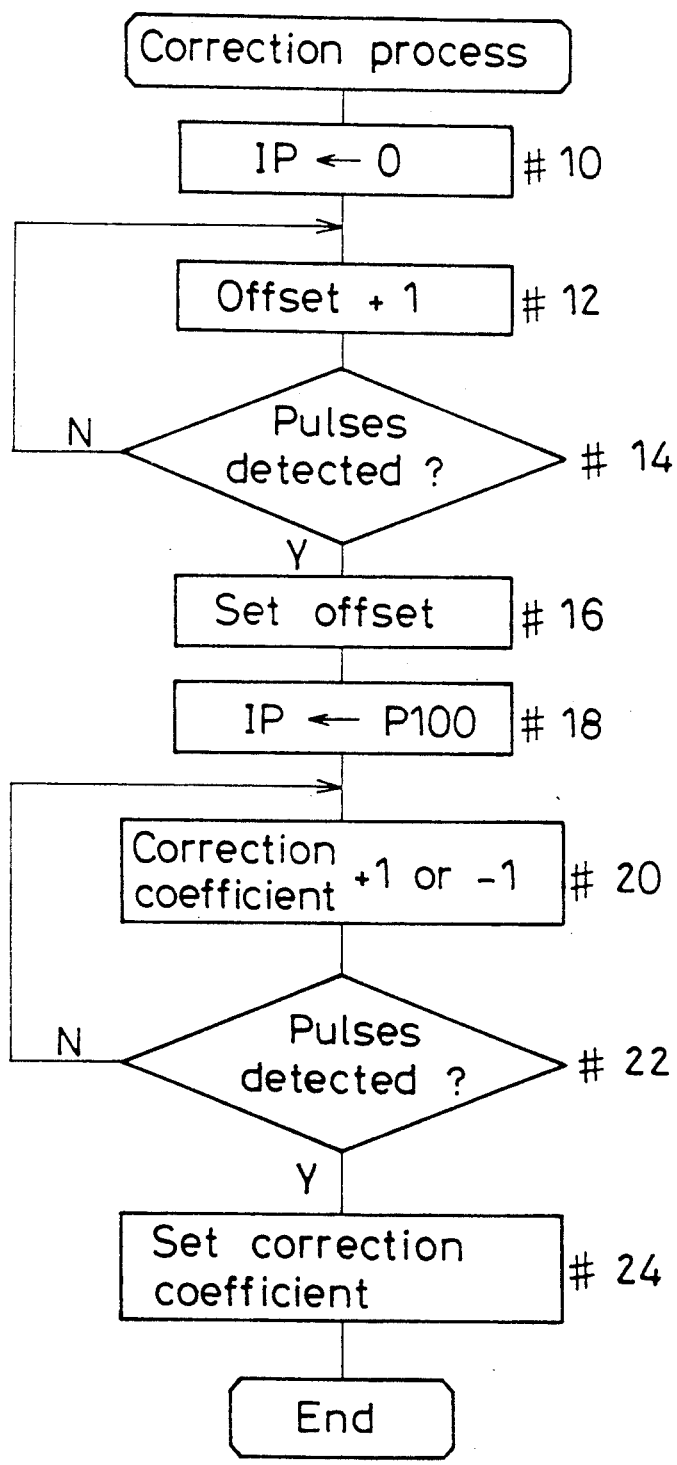
FIG. 13 is a flow chart of a process executed by a microcomputer of the embodiment shown in FIG. 9.

In this case, the microcomputer 30 executes a calibration process shown in FIG. 13 by using an output of the pulse detecting circuit 40 to generate the correction coefficient data Da and the offset data Db for obtaining a PWM output Sb ideal for the printing data. Firstly, at step #10, a value "0" is given to a first portion of the register 34 as the test data IP. The first portion of the register 34 is a place for inputting the printing data P under a normal condition. At the next step #12, the value of the offset data Db is increased by 1 from the present value. The value of the correction coefficient data Da is maintained intact. Thereby, the test data IP (=0) are multiplied by the correction coefficient data Da at the multiplier 36. At the adder 38, the multiplication result Dc (=0) and the offset data Db are added to generate the input data (step-number data) Di, which are given to the selector 32. At step #14, whether or not pulses are detected in the PWM output Sb corresponding to the input data Di generated as described above is judged based on the detection result by the pulse detecting circuit 40. When pulses are not detected, the process returns to step #12, where the value of the offset data Db is further increased by 1. The value of the offset data Db is gradually increased as described above, and when pulse is first detected from the pulse generating circuit 50, the process proceeds to step #16, where the value of the offset data Db at that time is set in the register 34.

Next, at step #18, the test data IP is set to a value P100 corresponding to a density of 100% (black), and while the value of the correction coefficient data Da is increased or decreased by 1 by the loop consisting of steps #20 and #22, the point of time when pulses starts to be detected from the pulse generating circuit 50 is detected. To describe in detail, here, the point of time when the pulses of tMAX shown in (b) of FIG. 12 starts to generate is detected from the condition shown in (d) of FIG. 12. When pulses are not detected, the value of the correction coefficient data Da is decreased by 1 at step #20. When pulses are detected, the value of the correction coefficient data Da is increased by 1. At step #22, the point of time when pulses starts to generate or disappear is detected. When this point of time is detected, the process proceeds to step #24, where the correction coefficient data Da at that time are set in the register 34, and the calibration process is finished.

Figure 14:
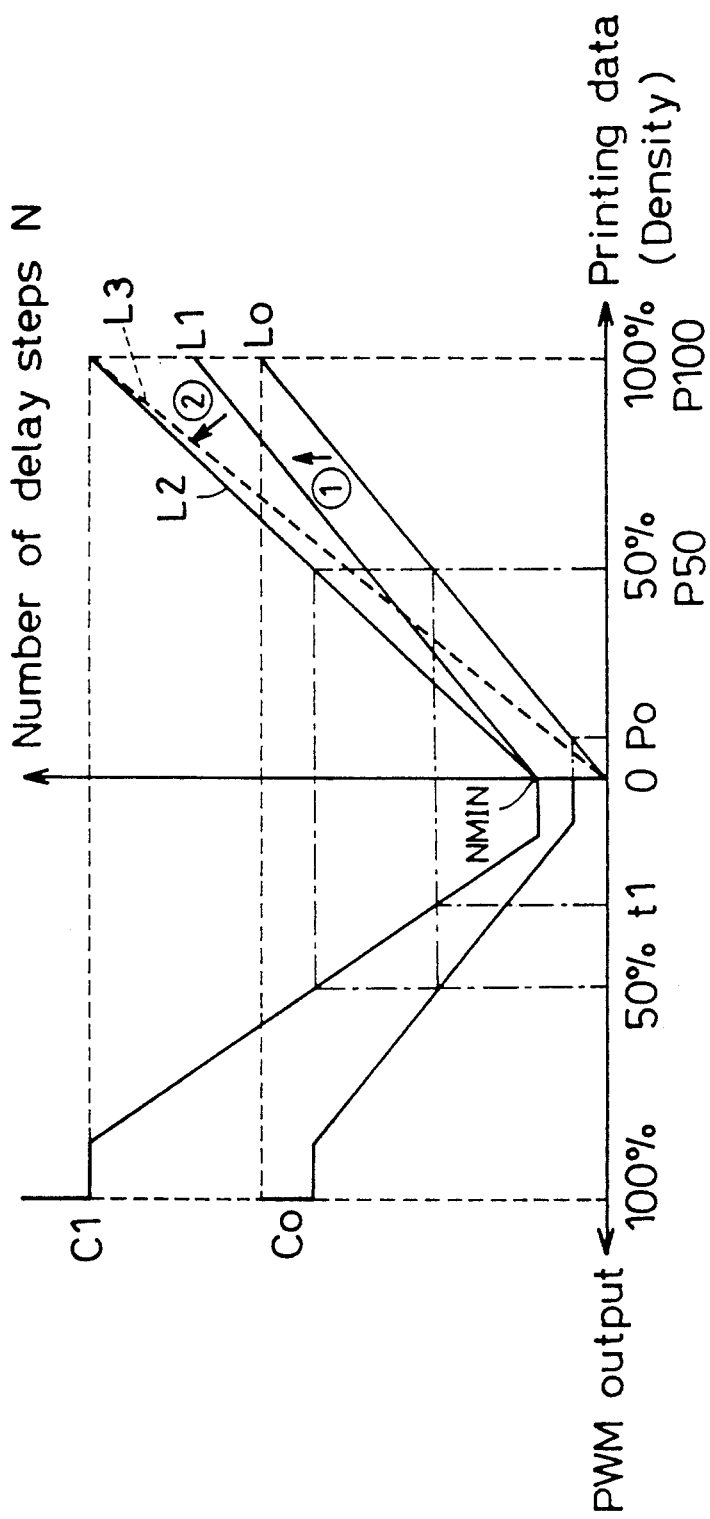
FIG. 14 is an explanatory view for explaining calibration processes executed in the embodiment shown in FIG. 9 and the embodiment shown in FIG. 15.

Referring to FIG. 14, the above-described calibration process is explained as follows. It is assumed that: at first, the relation between the input (step-number) data and the pulse width of the PWM circuit is represented by a line Co shown in the left side of the graph in FIG. 14; corresponding to that, the conversion from the printing data to the step-number data is represented by a line Lo; and the printing data are correctly converted into a pulse width. That is, it is assumed that when the printing data P50 corresponding to a density of 50% are inputted, the PWM circuit outputs pulses having a width corresponding exactly to a density of 50% by the lines Lo and Co. However, assuming that the characteristic of the delay devices of the PWM circuit is changed (that is, the delay time is decreased) by a change in environmental temperature or a variation in supply voltage so that the relation between the input step-number data and the width of the output pulse is changed to a relation represented by a line C1, a density in accordance with the printing data cannot be obtained (that is, the printing density decreases) even if the printing data P50 representing a printing density of 50% is converted into the step-number data with the line Lo, since the width of the outputted pulses is t1 which is smaller than a pulse width corresponding to a printing density of 50%. Moreover, even if printing data Po whose value is not 0 although it is extremely small are given, the PWM circuit does not output pulses in response to such small step-number data. This means that printing is not performed at all (PWM output=0%) even if printing (density) data whose value is not 0 are inputted, which is not preferable for printing apparatuses.

Therefore, of the above-described calibration processes, in the processes up to step #16, the test data IP are set to 0 at first, and while the value of the offset data Db is increased, the point of time when the pulse generating circuit 50 starts to generate pulses is detected. This corresponds to that the data conversion line Lo is parallelly moved to the line L1 (①), whereby pulses are always outputted in response to printing data whose value is not 0. Thus, the width of the output pulse in response to printing data whose value is nearly 0 can be calibrated.

However, since pulses having a correct width are not yet outputted in response to general printing data because of a variation in delay characteristic of the delay devices, in the processes from steps #18 to #24, the correction coefficient data Da are changed (the inclination of the data conversion line L1 is changed) as the second step so that the point of time when pulses start to generate corresponds to the printing data P100 representing a density of 100% in order to obtain a correct conversion line L2 (②).

By the above-described two-step calibration process when the density is 0% (white) and 100% (black) in which the pulse detecting circuit 40 is employed, a correct printing density is obtained nearly in the entire range of the printing data as understood from the line L2. Therefore, by setting the calibrated correction coefficient data Da and offset data Db in the register 34, and thereafter, giving the actual printing data P to the place, of the register 34, where the test data IP have been placed, the printing data are converted into pulses having a width corresponding to the density value represented by the printing data, and are outputted to a laser printing apparatus. That is, it does not occur that printing is not performed with the printing data having an extremely small value; it is prevented that printing is performed in the middle density or in entirely black with the printing data having a value close to 100%; and printing is performed in a density corresponding to the value of the printing data nearly in the entire range of the printing data.

It is possible to perform the calibration (of only the correction coefficient data Da) only when the density is 100% while maintaining the offset data Db at 0, ignoring the difference in width of the output pulses in response to the printing data whose value is extremely small, that is, without performing the calibration when the density is 0%. Even in this case, since the width of the output pulses is calibrated so that it is nearly proportional to the printing data as a whole as shown by a thick dotted line L3 in FIG. 14, the above-described calibration can satisfactorily be employed for the calibration for the difference in characteristics of the delay devices or a variation in environmental temperature and supply voltage.

Figure 15:
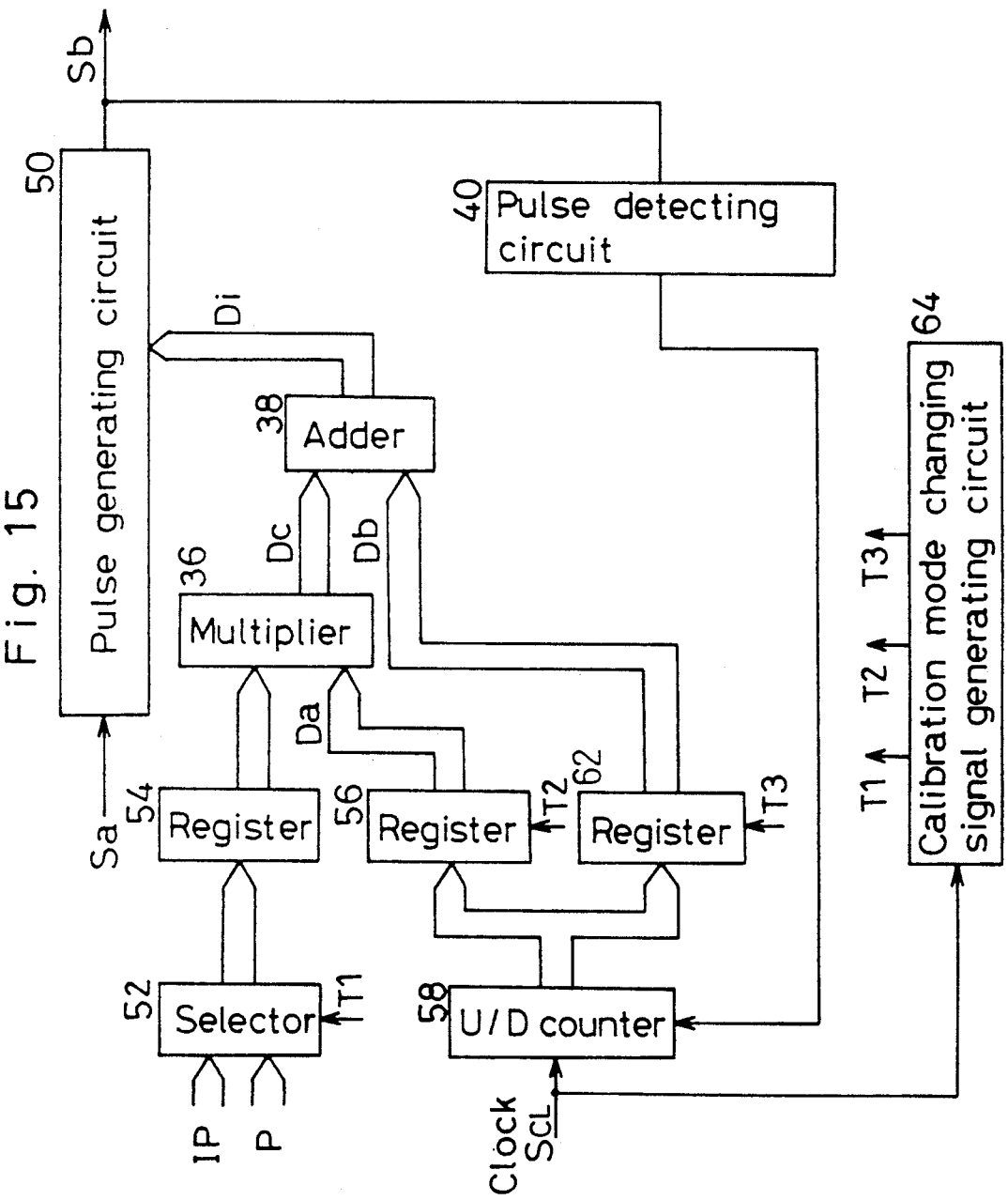
FIG. 15 is a block diagram showing a structure of a PWM pulse generating circuit which is another embodiment of the second feature shown in FIG. 8.

The above-described embodiment shown in FIG. 9 is controlled in a manner of software by the microcomputer 30. Next, a PWM control of similar type by a counter, etc. in a manner of hardware will be described referring to FIG. 15. A basic structure of this embodiment is the same as that of the circuit shown in FIG. 9. A pulse generating circuit 50, a pulse detecting circuit 40, a multiplier 36 and an adder 38 are the same as those shown in FIG. 9. In the embodiment of FIG. 15, by using a U/D counter 58 in place of the microcomputer 30, the optimum correction coefficient data Da and offset data Db are determined by increasing or decreasing by 1 the value of the correction coefficient data Da and that of the offset data Db based on the result of the pulse detection. A method will hereinafter be described to calibrate the correction coefficient data Da and the offset data Db when the density is 0% (white) and when the density is 100% (black) in the PWM circuit of the above-described structure by using the pulse detecting circuit 40 similarly to the above-described embodiment of FIG. 9.

In this PWM circuit, the calibration can be performed in various modes by giving from a mode changing signal generating circuit 64, a changing signal T1 to a data selector 52, a changing signal T2 to a register 56 for the correction coefficient data Da, a changing signal T3 to a register 62 for the offset data Db, and a changing signal T4 to a detection mode changer 60, respectively. In the mode where the same calibration as that in the above-described embodiment of FIG. 9 is performed when the density is 0% and 100% by using the pulse detecting circuit 40. the mode changing signal generating circuit 64 generates the following three signals T1 to T3 at the first step ((1)) shown in FIG. 14):

1) the changing signal T1 for changing the data selector 52 to the test data IP side;

2) the changing signal T2 for preventing the correction coefficient data register 56 from outputting data to the multiplier 36; and 3) the changing signal T3 for making the offset data register 62 output data to the adder 38.

When a pulse detection offset calibration mode is set by giving the above-described changing signals, firstly, the test data IP are set to "0", and are given to the multiplier 36 through the register 54. At the multiplier 36, where the test data IP are multiplied by the correction coefficient data Da, the multiplication result is 0, since the test data IP is 0. The multiplication result data Dc are added to the offset data Db at the adder 38, and are inputted to the pulse generating circuit 50 as the step-number data Di (=Db). The pulse detecting circuit 40 checks whether or not pulses are generated in the output by the pulse generating circuit 50 at this time. When pulses have not yet been generated (the condition shown in (c) of FIG. 12), the output value of the U/D counter 58 is increased; when pulses have already been generated, the value of the counter 58 is decreased. The value of the counter increased or decreased as described above is transmitted from the register 62 only to the adder 38 (it is not transmitted to the multiplier 36), and works so that the present data conversion line Lo approaches the conversion line L1 by moving the line Lo parallelly as shown in FIG. 14. The value of the offset data Db is increased as described above, and the value of the data Db when pulses start to generate is set in the register 62.

At the next step (2), the mode changing signal generating circuit 64 transmits the following signals to the registers 56 and 62, respectively:

2)' the changing signal T2 for making the correction coefficient data register 56 provide data to the multiplier 36; and 3)' the changing signal T3 for preventing the offset data register 62 from outputting data to the adder 38. T1 is maintained intact.

When the pulse detection correction coefficient data calibration mode is set by giving the above-described changing signals, this time, the test data IP are set to P100, and are given to the multiplier 36 through the register 54. The data are multiplied by the correction coefficient data Da at the multiplier 36, and then, are added to the offset data Db, which are set in the above-described process, at the adder 38, and are inputted into the pulse generating circuit 50 as the step-number data Di. Then, at the pulse detecting circuit 40, whether or not pulses are generating in the output from the pulse generating circuit 50 is checked. When pulses have not yet been generated (the condition shown in (d) of FIG. 12), the output value of the U/D counter 58 is decreased; when pulses have already been generated, it is increased. The value of the counter increased or decreased as described above is transmitted from the register 56 only to the multiplier 36 (it is not transmitted to the adder 38), and works so that the inclination of the line L1 approaches that of the correct conversion line L2 by changing it as shown in FIG. 14. The value of the correction coefficient data Da is increased or decreased as described above, and the value of the data Da when pulses start to generate is set in the register 56.

After the offset data Db and the correction coefficient data Da are calibrated as described above, the data selector 52 is changed, and by inputting the normal printing data P into the data register 54, the printing data P are multiplied by the calibrated correction coefficient data Da at the multiplier 36 and are added to the calibrated offset data Db at the adder 38 to generate the correct step-number data Di. Thus, the width of the output pulse Sb takes a value proportional to the printing data P nearly in the entire range of the printing density (see FIG. 14), so that a printing density in accordance with the data is obtained.

Figure 16:
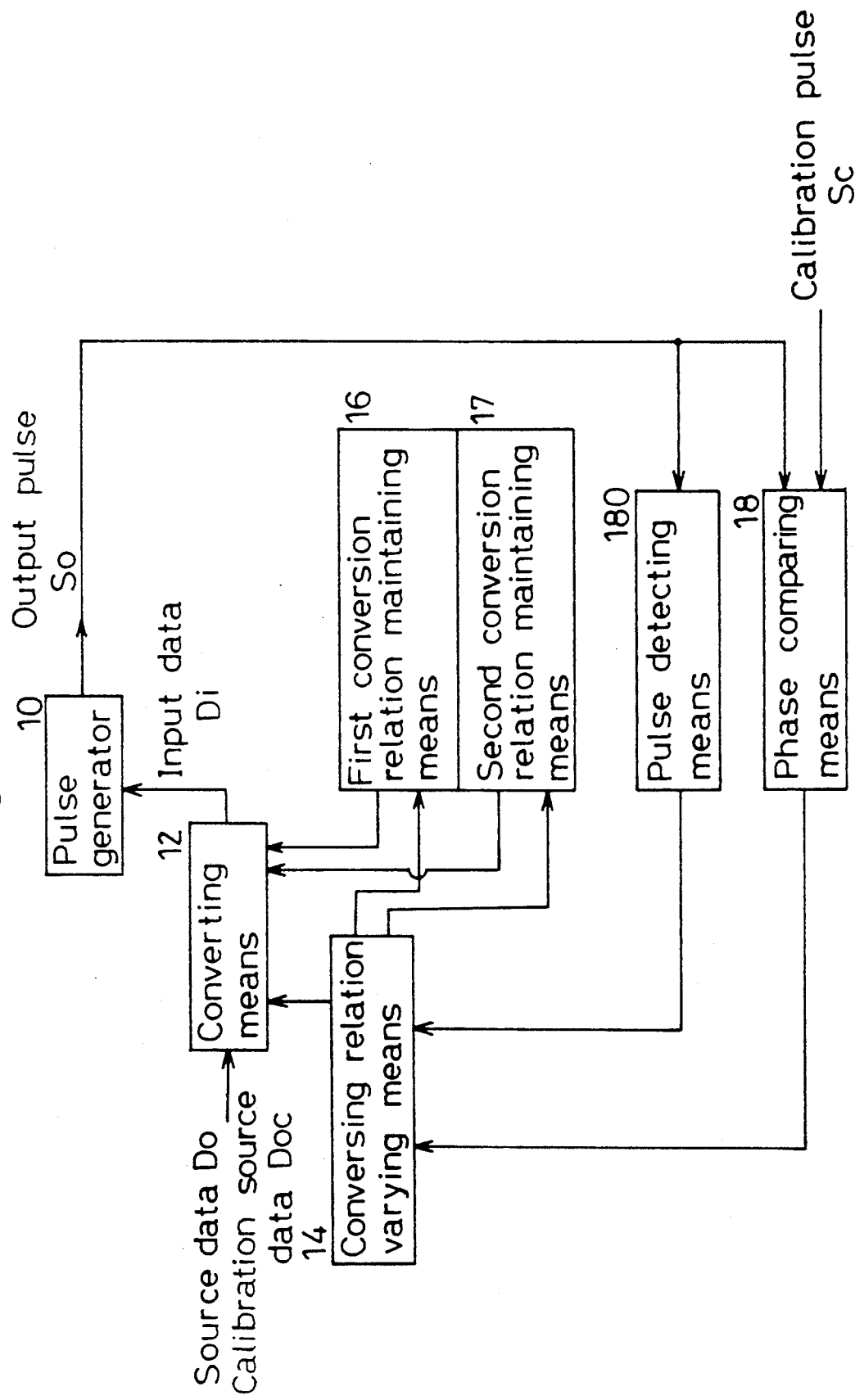
FIG. 16 is a block circuit diagram of a third feature of the present invention.

Next, a third feature of the present invention shown in FIG. 16 is provided with both of the phase comparing means 18 shown in FIG. 1 and the pulse detecting means 180 shown in FIG. 8. Moreover, as conversion relation maintaining means, it is provided with first conversion relation maintaining means 16 for maintaining a conversion relation between the source data Do and the input data Di when pulses start to generate in the output So of the pulse generator 10, and second conversion relation maintaining means 17 for maintaining a conversion relation between the calibration source data Doc corresponding to a pulse width of the calibration pulse Sc and the input data Di when the widths of the pulses So and Sc coincide at the phase comparing means 18.

When the source data Do are given to the converting means 12, the converting means 12 convert the source data Do into the input data Di based on a predetermined conversion relation, and gives them to the pulse generator 10. The conversion relation varying means 14 change the input data Di inputted to the pulse generator 10 by varying the conversion relation. The pulse So generated by the pulse generator 10 in response to the input data Di is given to the pulse detecting means 180 and the phase comparing means 18.

The pulse detecting means 180 in combination with the conversion relation varying means 14 detects the conversion relation when the pulse generator 10 starts to output pulses. That is, when pulses have not yet been outputted, the input data Di are changed by varying the conversion relation at the converting means 12 so that the pulse generator 10 outputs pulses; when pulses have already been outputted, the input data Di are changed so that the pulse generator 10 stops outputting pulses. Here, the condition where pulses are not outputted means not only the condition shown in (c) of FIG. 12 but also the condition shown in (d) of FIG. 12. The conversion relation between the source data Do and the input data Di when the pulse generator 10 starts to output pulses is maintained by the first conversion relation maintaining means 16.

At the phase comparing means 18, the phase of the output pulse So of the pulse generator 10 is compared with that of the calibration pulse Sc, and the result is returned to the conversion relation varying means 14. Thereby, the conversion relation varying means 14 vary the conversion relation at the converting means 12 so that the widths of the pulses So and Sc coincide, whereby the input data Di are influenced. When the width of the output pulse So of the pulse generator 10 and that of the calibration pulse Sc coincide, the conversion relation at that time between the calibration source data Doc and the input data Di is maintained at the second conversion relation maintaining means 17.

After the calibration with respect to the data conversion is finished by the pulse detection and phase comparison as described above, when the source data Do corresponding to a desired pulse width are inputted into the converting means 12, the converting means 12 generate the input data Di based on the relation maintained at the first and second conversion relation maintaining means 16 and 17, and input the data Di to the pulse generator 10. Thereby, it becomes possible to make the pulse generator 10 generate the pulse So having a desired pulse width and always generate the pulse So in response to any source data Do.

Figure 17:
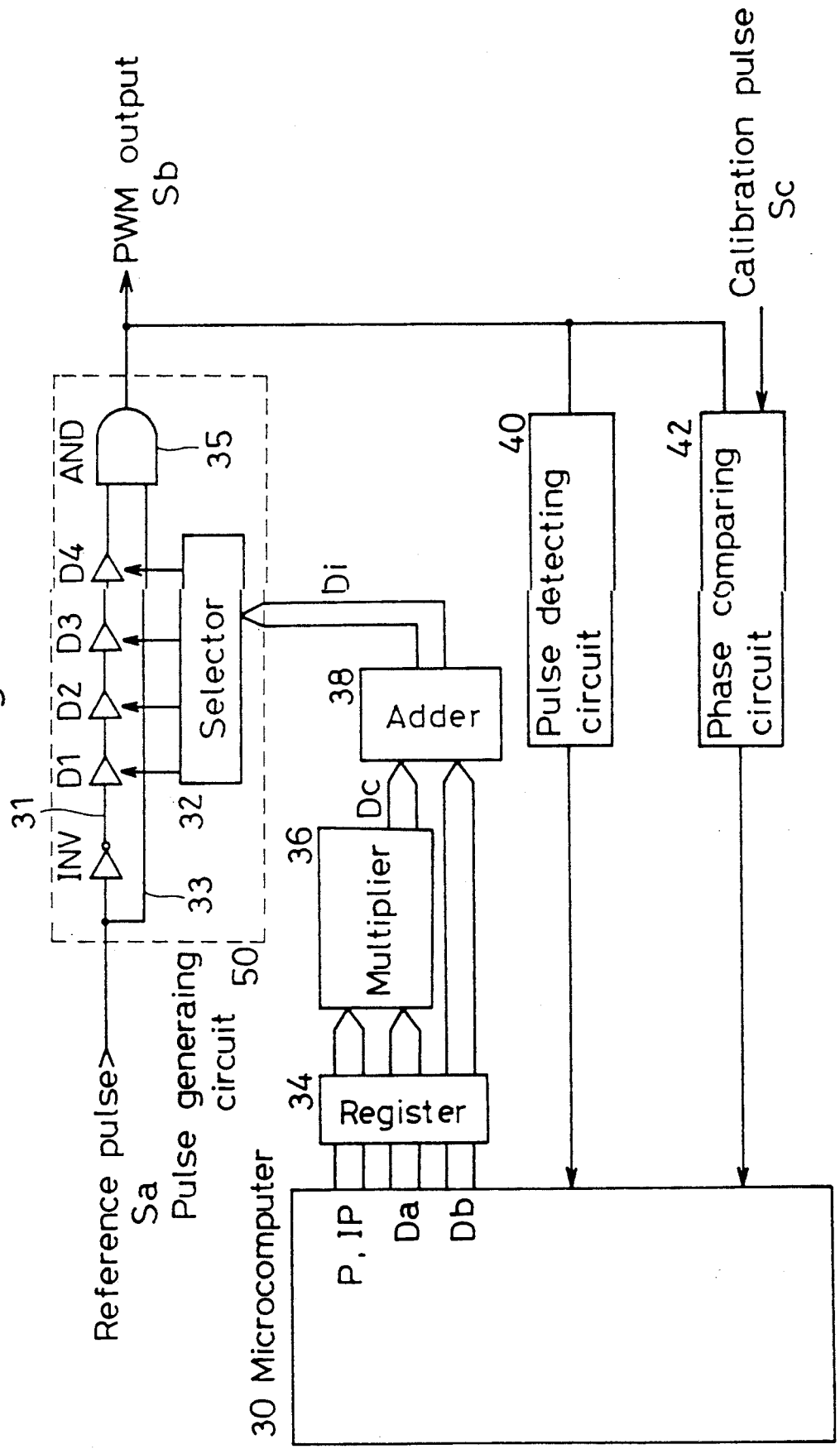
FIG. 17 is a block diagram showing a structure of a PWM pulse generating circuit which is a specific embodiment of the third feature shown in FIG. 16.

FIG. 17 shows a specific embodiment of the feature shown in FIG. 16. That is, FIG. 17 is a block diagram of the PWM pulse generating circuit for adjusting a laser output of a laser printing apparatus for digital copying machines.

Firstly, this embodiment is provided with the pulse detecting circuit 40 which detects whether or not pulses are outputted by the AND circuit and the phase comparing circuit 42 which compares the phases of the PWM output Sb with the calibration pulse Sc. The pulse detecting circuit 40 detects the point of time when pulses are detected as shown in (b) of FIG. 12 from the conditions shown in (c) and (d) of FIG. 12. Moreover, the calibration pulse Sc inputted into the phase comparing circuit 42 is a pulse having a width corresponding to the value of a point within the range of the PWM output Sb. Usually, it is preferable that the calibration pulse Sc has a pulse width most frequently used (or to be most precisely controlled) in the PWM circuit.

Specific examples of structures of the pulse detecting circuit 40 and the phase comparing circuit 42 are shown in FIGS. 10 and 4, respectively.

Next, an operation of the microcomputer 30 will be described in the case where the relation between the printing data and the width of the output pulses in the PWM pulse generating circuit of the above-described structure. Firstly, a method to perform a two-step calibration will be described, where:

i) printing data corresponding to a printing density of 0 (white) are given and the offset data Db are calibrated until the pulse generating circuit 50 generates pulses in response to the printing data, and then, printing data corresponding to a density of 50% are given and the correction coefficient data Da are calibrated by the calibration pulse so that the width of the output pulses generated by the pulse generating circuit 50 at this time corresponds to a density of 50%.

Figure 18:
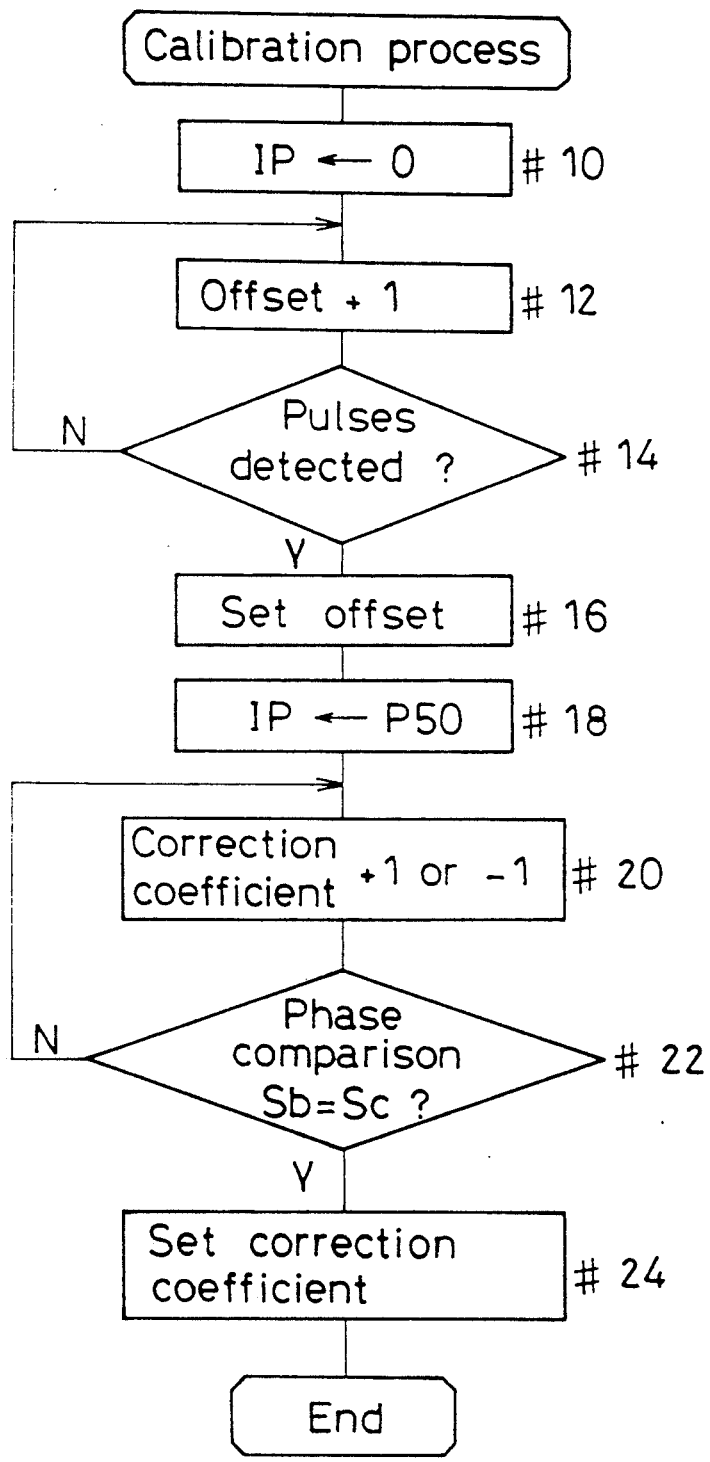
FIGS. 18, 19 and 20 are flow charts of various calibration processes executed by a microcomputer of the embodiment shown in FIG. 16.

In this case, the microcomputer 30 executes a process shown in FIG. 18. First, at step #10, a value "0" is given to a first portion of the register 34 as the test data IP. The first portion of the register 34 is a place for inputting the printing data P under a normal condition. At the next step #12, the value of the offset data Db is increased by 1 from the present value. The correction coefficient data Da are maintained intact. Thereby, the test data IP (=0) are multiplied by the correction coefficient data Da at the multiplier 36, and at the adder 38, the multiplication result Dc (=0) is added to the offset data Db to generate the input data (step-number data) Di, which are given to the selector 32. At step #14, whether or not pulses are detected in the PWM output Sb corresponding to the input data Di (=Db) generated as described above is judged based on the detection result by the pulse generating circuit 40. When pulses are not detected, the process returns to step #12, where the value of the offset data Db is increased by 1.

When pulses are detected at step #14, the process proceeds to step #16, where the offset data Db (NMIN) at that time are set in a third portion of the register 34.

Next, at step #18, the test data IP are set to the printing data P50 corresponding to a printing density of 50%, and are given to the first portion of the register 34. Then, at step #20, the value of the correction coefficient data Da is increased or decreased by 1 from the present value. The test data P50 are multiplied by the increased or decreased correction coefficient data Da at the multiplier 36, and the multiplication result Dc is added to the offset data NMIN, set as described above, at the adder 38 to generate the input data Di. The phase of the PWM output Sb corresponding to the input data Di generated as described above is compared with the phase of the calibration pulse Sc having a width exactly corresponding to 50% at step #22. When the pulse widths of the pulses Sb and Sc do not coincide, the process returns to step #20, where the value of the correction coefficient data Da is increased or decreased by 1. To describe in detail, when the width of the output pulse Sb of the pulse generating circuit 50 is smaller than that of the calibration pulse Sc corresponding to a density of 50% the value of the correction coefficient data Da is increased by 1; when Sb > Sc, the value of the data Da is decreased by 1. When Sb becomes Sb=Sc at step #22, the process proceeds to step #24, where the correction coefficient data Da at that time are set in the register 34, and the calibration process is finished.

Referring to FIG. 14, the above-described calibration process is explained as follows. It is assumed that: at first, the relation between the input (step-number) data and the pulse width of the PWM circuit is represented by a line Co in the left side of the graph in the figure; corresponding to that, the conversion from the printing data to the step-number data is represented by a line Lo; and the printing data were correctly converted into a pulse width. That is, when the printing data P50 corresponding to a density of 50% are inputted, pulses having a width of exactly 50% are outputted by the PWM circuit by the lines Co and Lo. However, assuming that the characteristics of the delay devices of the PWM circuit are changed (that is, the delay time is decreased) by a change in environmental temperature or a variation in supply voltage so that the relation between the input step-number data and the width of the output pulse is changed to a relation represented by a line C1, even if the printing data P50 corresponding to a density of 50% are converted into the step-number data by the line Lo, the width of the outputted pulse is t1 which is smaller than 50%, so that the density in accordance with the printing data cannot be obtained (that is, the printing density decreases). Moreover, even if the printing data Po whose value is not 0 although it is extremely small are given, the PWM circuit does not output pulses in response to such small step-number data. This means that printing operation is not performed at all (the PWM output = 0%) even if the printing (density) data whose value is not 0 are inputted, which is not preferable for printing apparatuses.

Therefore, of the above-described calibration processes, in the processes up to step #16, the test data IP are set to 0 at first, and while the value of the offset data Db is increased, the point of time when pulses start to generate from the PWM circuit is detected. This corresponds to that the data conversion line Lo is parallelly moved (①) to the line L1. Thereby, pulses are always outputted in response to the printing data whose value is not 0, which enables the calibration of the width of the output pulses in response to the printing data whose value is close to 0.

However, since pulses having a correct width are not yet outputted in response to general printing data because of a variation in delay characteristic of the delay devices, in the processes from steps #18 to #24, the correction coefficient data Da are calibrated (the inclination of the data conversion line L1 is changed) as the second step by comparing the phase of the output of the pulse generating circuit 50, in response to the printing data P50 representing a density of 50% with the phase of the calibration pulse having a width exactly corresponding to a density of 50% in order to obtain a correct conversion line L2 (②)

Using the pulse detecting circuit 40 and the phase comparing circuit 42 as described above, by the two-step calibration process when the density is 0% (white) and 50%, a correct printing density is obtained nearly in the entire range of the printing data as understood from the line L2. Therefore, by setting the calibrated correction coefficient data Da and offset data Db in the register 34, and thereafter, giving the actual printing data P to the place, of the register 34, where the test data IP is placed, the printing data are converted into pulses having a width corresponding to the density value represented by the printing data, and are outputted to a laser printing apparatus. In the above-described embodiment, the 50% density point is chosen to be the calibration point as the representative of the middle density point; it can be 30% or 70%.

Next, a method will be described where although both of the pulse detecting circuit 40 and the phase comparing circuit 42 are employed similarly to the above-described method, the correction coefficient data Da and the offset data Db are calibrated in a different manner. Here, a method to perform a two-step calibration will be described, where:

ii) firstly, printing data corresponding to a density of 100% are given, and the correction coefficient data Da are calibrated so that the point of time when pulses stop to generate from the pulse generating circuit 50 in response to the printing data, and then, printing data corresponding to 50% are given, and the offset data Db are calibrated with the calibration pulse so that the width of the output pulse of the pulse generating circuit 50 at this time corresponds exatly to 50%.

Figure 19:
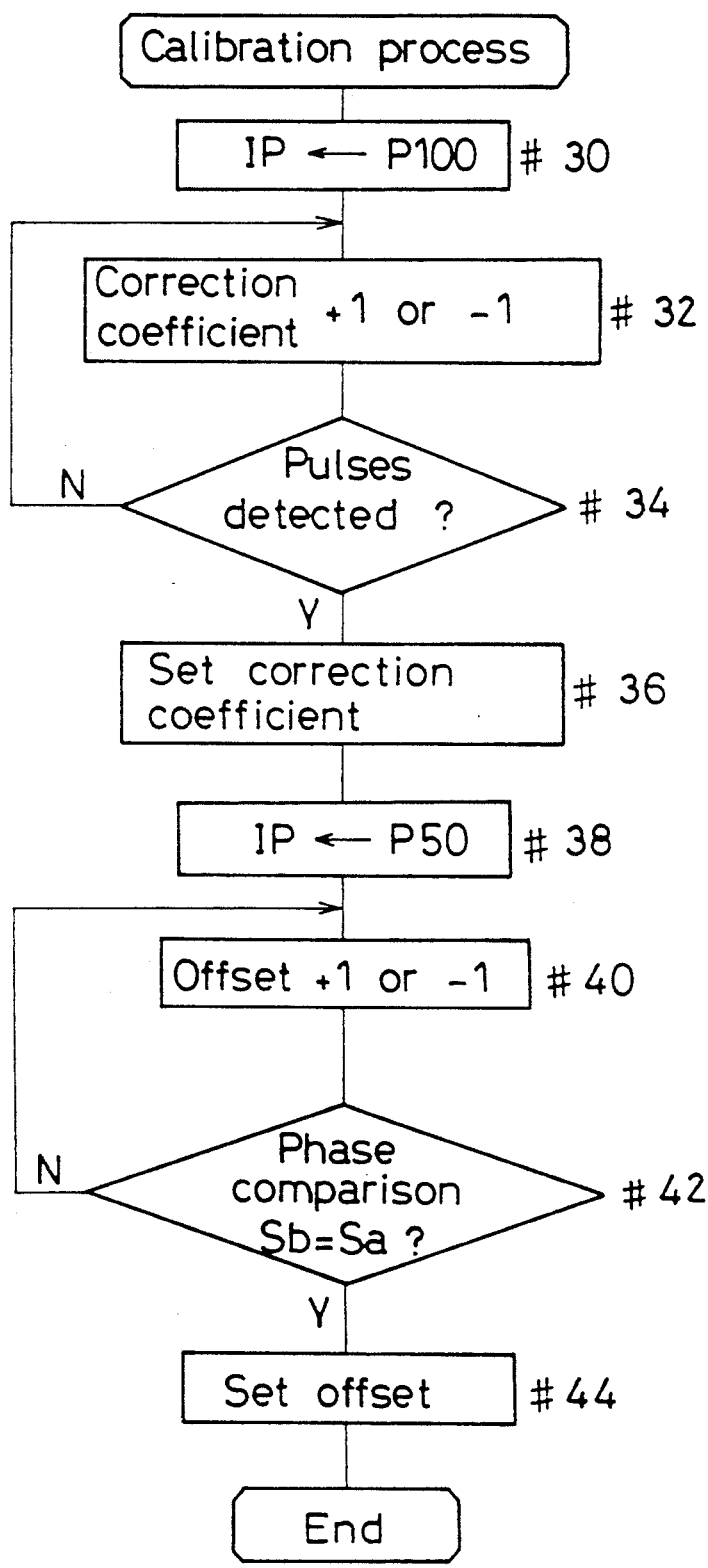

In this case, the microcomputer 30 executes the process shown in FIG. 19. Firstly, at step #30, the value P100 corresponding to a printing density of 100% (black) is given to the first portion of the register 34 as the test data IP, and at step #32, the value of the correction coefficient data Da is increased or decreased by 1 from the present value. The offset data Db are maintained intact. Thereby, the test data P100 are mutiplied by the correction coefficient data Da at the multiplier 36, and the multiplication result Dc is added to the offset data Db at the adder 38. The result of the addition is given to the selector 32 as the input data (step-number data) Di. At step #34, the exact point of time is detected when pulses disappear from the PWM output Sb corresponding to the input data Di generated as described above (that is, the point of time when the pulse tMAX having the maximum pulse width shown in (b) FIG. of 12 starts to generate from the condition shown in (d) FIG. of 12). When the above point of time is detected, the process proceeds to step #36, where the correction coefficient data Da at that time are set in a second portion of the register 34.

Next, at step #38, the test IP are set to the printing data P50 corresponding to a printing density of 50%, and are given to the first portion of the register 34. Then, at step #40, the value of the offset data Db is increased or decreased by 1 from the present value. The test data P50 are multiplied by the correction coefficient data Da, set as described above, at the multiplier 36, and the multiplication result Dc is added to the increased or decreased offset data Db at the adder 38 to generate the input data Di. At step #42, the phase of the PWM output Sb corresponding to the input data Di generated as described above is compared with the phase of the calibration pulse Sc having a width exactly corresponding to a printing density of 50%. When the pulse widths of both of the pulses Sb and Sc do not coincide, the process returns to step #40, where the value of the offset data Db is increased or decreased by 1. To describe in detail, when the width of the output pulse Sb of the pulse generating circuit 50 is smaller than that of the calibration pulse Sc corresponding to a density of 50% the value of the offset data Db is increased by 1; when Sb>Sc, the value of the data Db is decreased by 1. When Sb becomes Sb=Sc at step #42, the process proceeds to step #44, where the offset data Db at that time are set in the register 34, and the calibration process is finished.

Figure 21:
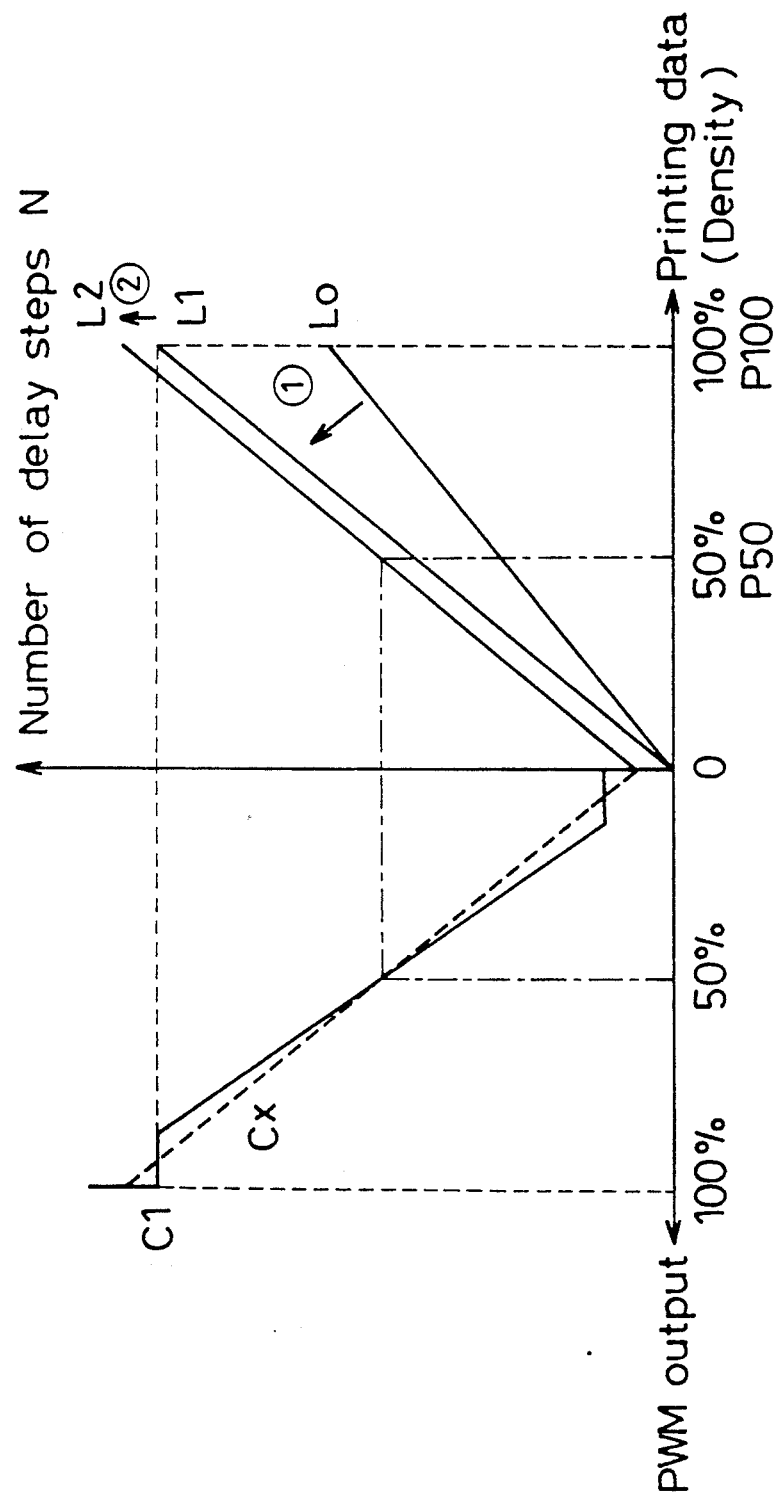
FIGS. 21 and 22 are explanatory views for explaining the calibration processes shown in FIGS. 18, 19 and 20.

The above-described calibration process will hereinafter be explained referring to FIG. 21. It is assumed that although a conversion is correctly performed at fist similarly to the case shown in FIG. 14, the characteristics of the delay devices of the PWM circuit are changed by a change in environmental temperature or by a variation in supply voltage, so that the relation between the width of the output pulse and the input step-number data is changed to the relation as shown by the line C1. Of the above-described calibration processes, in the processes up to step #36, firstly, the test data IP are set to the P100 which is the maximum density point, the correction coefficient data Da are calibrated, and the point of time is detected when pulses disappear from the output Sb of the PWM circuit. This corresponds to that the inclination of the data conversion line Lo is changed to that of the line L1 (①), whereby it is prevented that the printing is performed in halftone in response to the printing data representing a density of 100% (black) and that the printing is performed in black in response to the printing data representing a density of other than 100% (for example, 90%), and the printing is performed correctly in black in response to the printing data representing a density of 100%.

In the second-step process consisting of steps #38 to #44, in order to obtain the conversion line L2 where a correct printing output is obtained exactly at a density point of 50% (②), the offset data Db are calibrated (that is, the data conversion line L1 is parallelly moved) by comparing the phase of the output pulse of the pulse generating circuit 50 in response to the printing data P50 representing a density of 50% with the phase of the calibration pulse having a width corresponding exactly to 50%. Thereby, the printing data and pulse output are calibrated at two points, that is, at the maximum density point (a density of 100%) and at the middle density point (a density of 50%), and if the characteristics of the lines representing both outputs is considered, the conversion lines of the both approach the ideal relation, as shown by the line Cx, in the entire range of the printing data.

Figure 22:
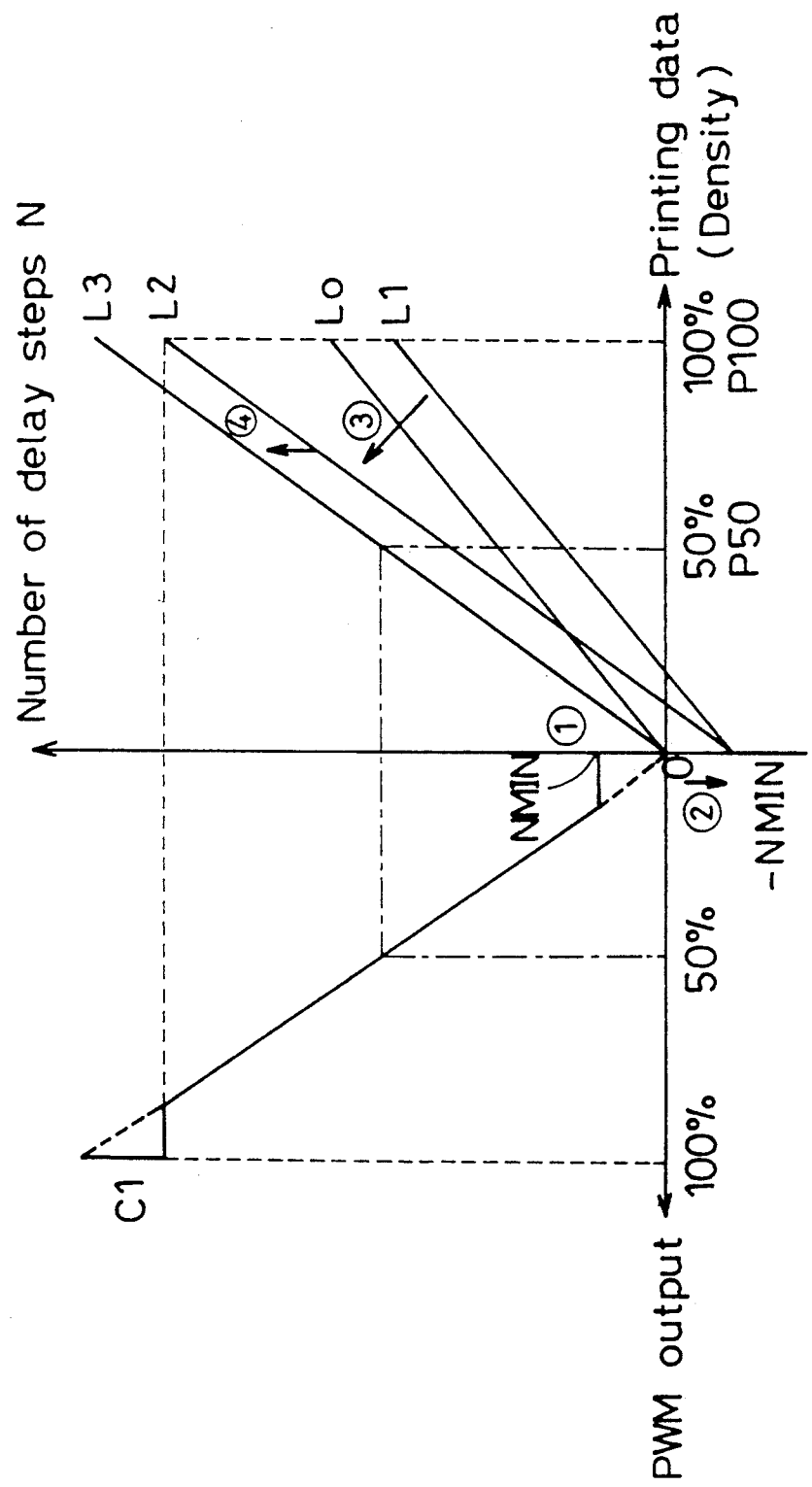

An example of a third calibration method will be described referring to FIGS. 20 and 22. Here, a method to perform a three-step calibration will be described, where:

iii) the offset data are searched which make the pulse generating circuit 50 generate pulses in response to the printing data corresponding to a printing density of 0 (white);

next, by giving the offset data in minus quantity, and also by giving the printing data corresponding to a density of 100%, the correction coefficient data Da are calibrated so that the point of time when pulses stop to generate from the pulse generating circuit 50 corresponds to the printing data; and iii) lastly, by giving the printing data corresponding to a density of 50%, the offset data Db are calibrated with the calibration pulse so that the width of the output pulses at this time generated by the pulse generating circuit 50 corresponds exactly to a density of 50%.

Figure 20:
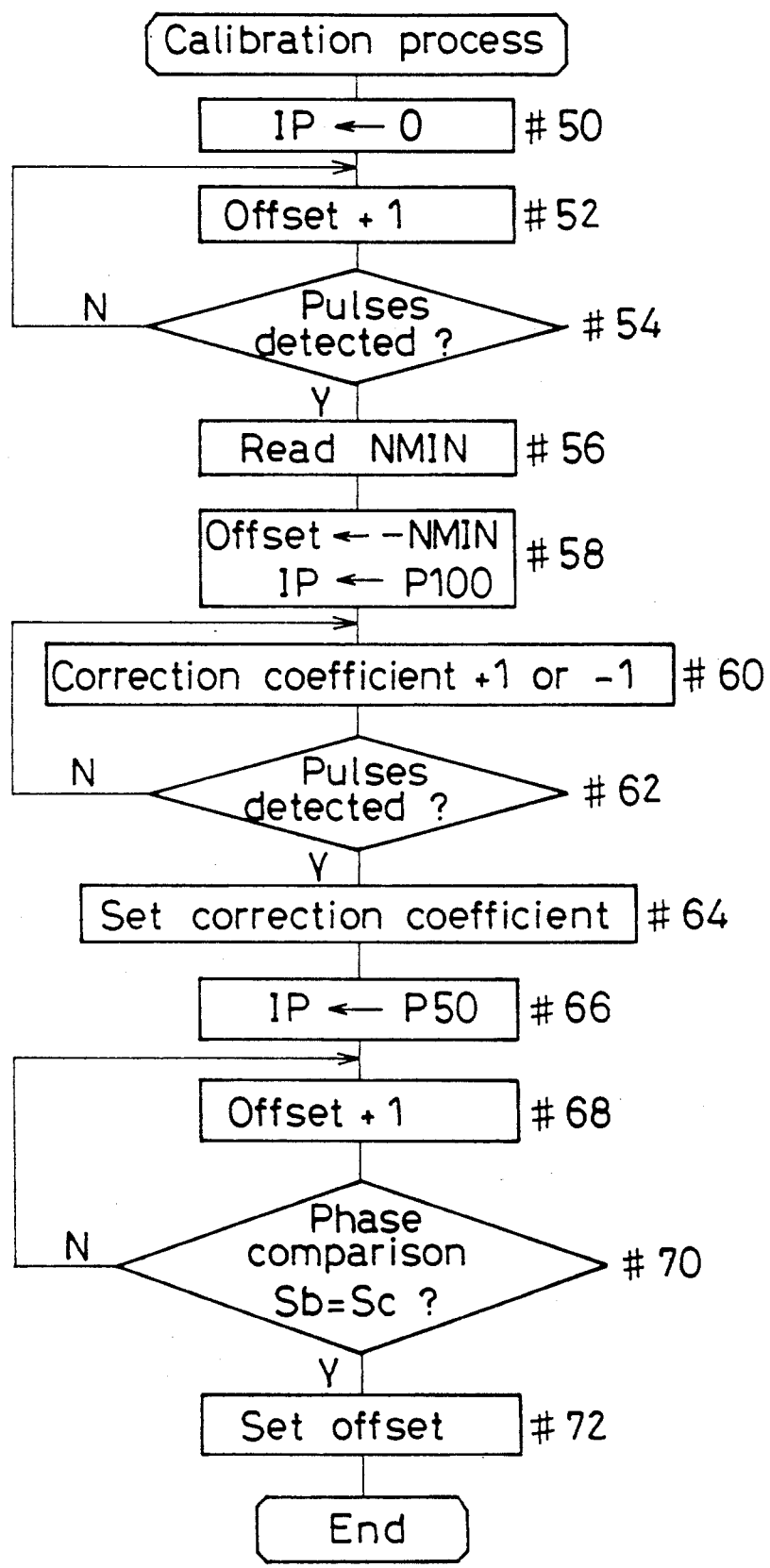

In this case, the microcomputer 30 executes the process shown in FIG. 20. Firstly, at step #50, 0 (corresponding to white) is given to the first portion of the register 34 as the test data IP, and at step #52, the value of the offset data Db is increased by 1. Thereby, the test data IP (=0) are multiplied by the correction coefficient data Da at the multiplier 36, and at the adder 38, the multiplication result Dc (=0) is added to the offset data Db to generate the input data (step-number data) Di, which are given to the selector 32. At step #54, whether or not pulses are detected in the PWM output Sb corresponding to the input data Di (=Db) generated as described above is judged based on the detection result by the pulse detecting circuit 40. When pulses are not detected, the process returns to step #52, where the value of the offset data Db is increased by 1.

When pulses are detected at step #54, the process proceeds to step #56, where the offset data Db (NMIN) at that time are stored in a memory. The above-described process corresponds, in FIG. 22, to the step shown by (①) where the present minimum number NMIN of delay steps for outputting pulses is obtained by the PWM circuit.

Next, at step #58, the value P100 corresponding to a printing density of 100% (black) is given to the first portion of the register 34 as the test data IP, and the minimum step-number data NMIN stored in the memory are multiplied by −1, which are placed in the third portion of the register 34. This corresponds to that the present conversion line Lo is parallelly moved downward by NMIN to obtain the line L1 (②). Then, at step #60, the value of the correction coefficient data Da is increased or decreased by 1 from the present value, and at step #62, the point of time when pulses disappear from the PWM output Sb is detected. This corresponds to that the inclination of the line L1 is changed to obtain the line L2 (③). When the point of time when the pulses disappear corresponds to the printing data P100 representing a density of 100%, the process proceeds to step #64, where the correction coefficient data Da at that time are set in the second portion of the register 34.

Next, at step #66, the test data IP are set to the printing data P50 corresponding to a printing density of 50% and are given to the first portion of the register 34. Then, at step #68, the value of the offset data Db is increased or decreased by 1 from the present value. At step #70, the phase of the output pulse Sb at this time is compared with the phase of the calibration pulse Sc having a width corresponding exactly to 50%. When Sb becomes Sb=Sc at step #70, the process proceeds to step #72, where the offset data Db at that time are set in the register 34, and the calibration process is finished. This last process corresponds, in FIG. 22, to that the conversion line L2 is parallelly moved to the line L3 so that the middle density point (a density point of 50% in this case) coincides with a correct value ((④)), which means that the relation between the printing data and the width of the output pulse is correctly calibrated especially at the middle density range.

The above-described embodiment shown in FIG. 17 is controlled in a manner of software by the microcomputer 30. Next, a PWM control of similar type by a counter, etc. in a manner of hardware will be described referring to FIG. 23. A basic structure of this embodiment is the same as that of the circuit shown in FIG. 17. In the figure, a pulse generating circuit 50, a pulse detecting circuit 40, a phase comparing circuit 42, a multiplier 36 and an adder 38 are the same as those shown in FIG. 17. In this embodiment, the U/D counter 58 is employed in place of the microcomputer 30. The optimum correction coefficient data Da and offset data Db are determined while the value of the correction coefficient data Da and that of the offset data Db are increased or decreased by 1 with the counter 58 based on the result of the pulse detection and phase comparison.

In this PWM circuit, similarly to the above-described control by the microcomputer (including the above-described i), ii) and iii), the calibration can be performed in various modes by giving from a mode changing signal generating circuit 64, a changing signal T1 to a data selector 52, a changing signal T2 to a register 56 for the correction coefficient data Da, a changing signal T3 to a register 62 for the offset data Db, and a changing signal T4 to a detection mode changer 60, respectively. In this specification, a procedure to perform the above-described calibration of i) will hereinafter be described as an example.

In this calibration mode, firstly, in order to set the offset data Db (steps #10 to #16 in FIG. 18 and (①) in FIG. 14), the mode changing signal generating circuit 64 generates the following four changing signals T1 to T4:

1) the changing signal T1 for changing the data selector 52 to the test data IP side;

2) the changing signal T2 for preventing the correction coefficient data register 56 from outputting data to the multiplier 36;

3) the changing signal T3 for making the offset data register 62 output data to the adder 38; and 4) the changing signal T4 for changing a mode changing switch 60 to the pulse detecting circuit 40 side.

When the pulse detection calibration mode is set by giving such changing signals, firstly, the test data IP are set to 0, and are given to the multiplier 36 through the register 54. The test data IP are multiplied by the correction coefficient data Da at the multiplier 36, and the data Dc (=0) which is the multiplication result are added to the offset data Db at the adder 38 to generated the input data Di (=Db). Whether or not pulses are generated in the output Sb of the pulse generating circuit 50 in response to the input data Di is checked by the pulse detecting circuit 40. When pulses are not generated, the output value of the U/D counter 58 is increased by 1. Thereby, the value of the input data Di is increased by 1, and the pulse generating circuit 50 generates output corresponding to the increased input data Di. The value of the U/D counter 58 when pulses start to generate is set in the register 62, whereby the offset data Db are calibrated.

At the next step (②), the mode changing signal generating circuit 64 transmits the following signals to the registers 56 and 62, respectively:

2)' the changing signal T2 for making the correction coefficient data register 56 output data to the multiplier 36;

3)' the changing signal T3 for preventing the offset data register 62 from outputting data to the adder 38; and 4)' the changing signal T4 for changing the mode changing switch 60 to the phase comparing circuit 42 side. T1 is maintained intact. When the printing data P50 representing a density of 50% are given to the multiplier 36 through the register 54 as the test data IP in the above condition, the printing data P50 are multiplied by the present correction coefficient data Da, and are added to the offset data Db, set as described above, at the adder 38 to generate the input data Di. When the pulse Sb corresponding to the input data Di is outputted by the pulse generating circuit 50, the phase of the pulse Sb is compared with the phase of the calibration pulse Sc having a width corresponding exactly to 50% at the phase comparing circuit 42. When the widths of the two pulses are different, the counter value of the U/D counter 58 is increased or decreased by 1 to increase or decrease the input data Di. When Sb becomes Sb=Sc, the U/D counter 58 stops, and the value at that time is set in the register 56 as the correction coefficient data Da.

After the offset data Db and the correction coefficient data Da are calibrated as described above, the data selector 52 is changed, and by inputting the normal printing data P into the data register 54, the printing data P are multiplied by the calibrated correction coefficient data Da at the multiplier 36 and are added to the calibrated offset data Db at the adder 38 to generate the correct step-number data Di.

Figure 23:
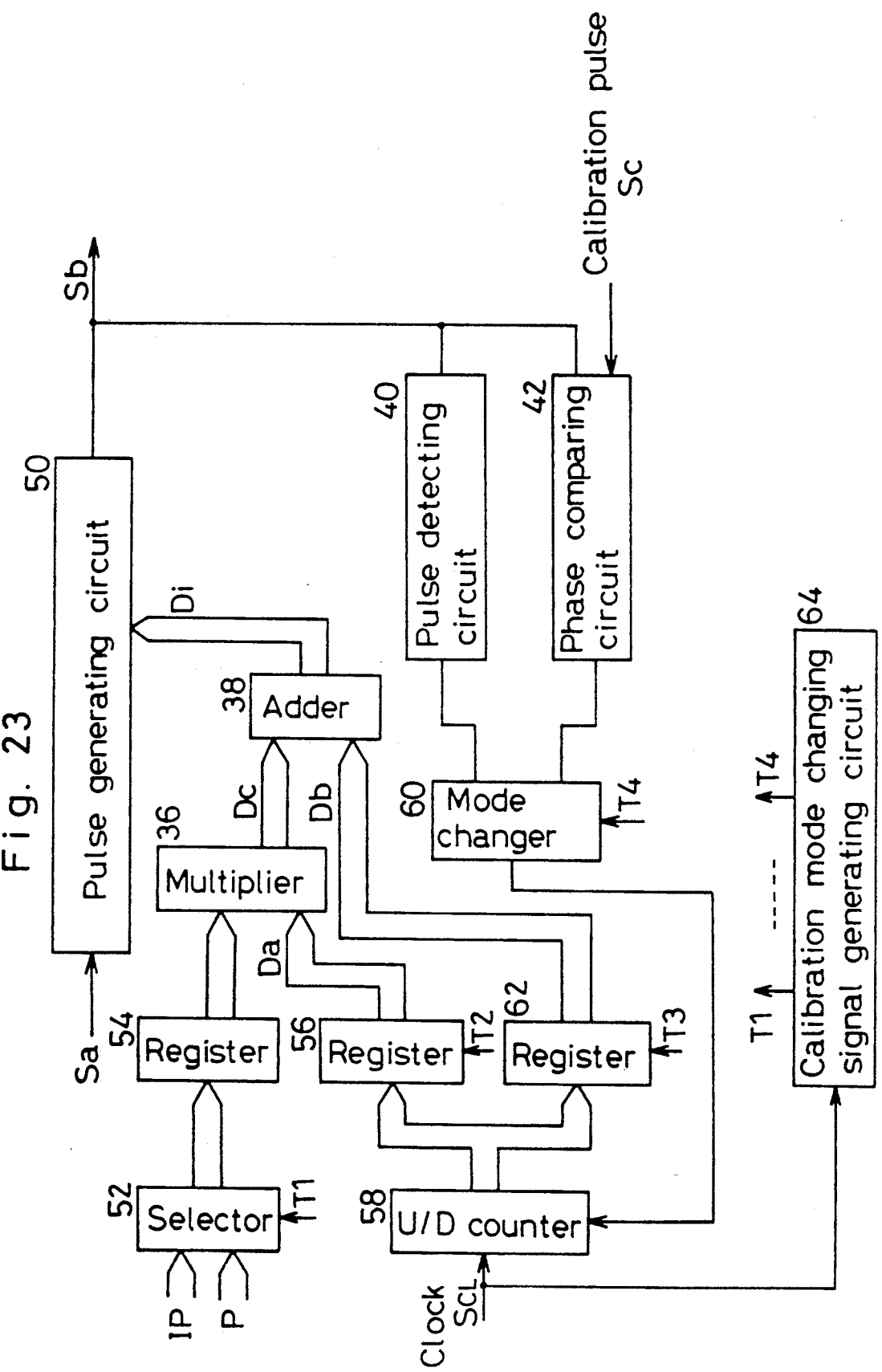
FIG. 23 is a block diagram showing a structure of a PWM pulse generating circuit which is another embodiment of the third feature shown in FIG. 16.

Thus, in the circuit of hardware shown in FIG. 23, the relation between the printing data and the width of the output pulse can be calibrated in the same process as that of the circuit shown in FIG. 17 where the microcomputer 30 is employed.

Obviously, many modifications and variations of the present invention are possible in light of the above teachings. It is therefore to be understood that within the scope of the appended claims, the invention may be practiced other than as specifically described.

What is claimed is:

1. A data generator which generates input data for a pulse generator from source data having a desired pulse width in order to cause said pulse generator to generate an output pulse having the desired pulse width, the data generator comprising:

converting means for converting source data into input data for said pulse generator based on a predetermined conversion relation;
conversion relation varying means for varying the predetermined conversion relation;
phase comparing means for comparing a pulse width of an output pulse from the pulse generator with the pulse width of a calibration pulse which has a predetermined pulse width; and
conversion relation maintaining means for maintaining a conversion relation between calibration source data, corresponding to the pulse width of the calibration pulse, and the input data when the phase comparing means determines that the pulse width of the output pulse coincides with the pulse width of the calibration pulse.

2. A data generator which generates input data for a pulse generator from source data having a desired pulse width in order to cause said pulse generator to generate an output pulse having the desired pulse width, the data generator comprising:

converting means for converting source data into input data for said pulse generator based on a predetermined conversion relation;
conversion relation varying means for varying the predetermined conversion relation;
pulse detecting means for detecting whether or not pulses have been generated in an ouput of the pulse generator; and
conversion relation maintaining means for maintaining a conversion relation between the source data and the input data when pulses start to be generated in the output of the pulse generator.

3. A data generator which genertes input data for a pulse generator from source data having a desired pulse width in order to cause said pulse generator to generate an output pulse having the desired pulse width, the data generator comprising:

converting means for converting source data into input data for said pulse generator based on a predetermined conversion relation;
conversion relation varying means for varying the predetermined conversion relation;
pulse detecting means for detecting whether or not there are pulses in an output of said pulse generator;
first conversion relation maintaining means for maintaining a conversion relation between the source data and the input data when pulses start to be generated in the output of the pulse generator;
phase comparing means for comparing the pulse width of an output pulse from the pulse generator with the pulse width of a calibration pulse which has a predetermined pulse width; and
second conversion relation maintaining means for maintaining a conversion relation between calibration source data, corresponding to the pulse width of the calibration pulse, and the input data when the phase comparing means determines that the pulse width of the output pulse coincides with the pulse width of the calibration pulse.

* * * * *